(12) United States Patent
Shain et al.

(10) Patent No.: US 10,255,084 B2
(45) Date of Patent: Apr. 9, 2019

(54) MANAGE ANALYTICS CONTEXTS THROUGH A SERIES OF ANALYTICS INTERACTIONS VIA A GRAPHICAL USER INTERFACE

(71) Applicant: HEWLETT PACKARD ENTERPRISE DEVELOPMENT LP, Houston, TX (US)

(72) Inventors: Olga Shain, Haifa (IL); Yaniv Sabo, Haifa (IL); Renato Keshet, Haifa (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 230 days.

(21) Appl. No.: 15/184,478

(22) Filed: Jun. 16, 2016

(65) Prior Publication Data

US 2017/0364373 A1    Dec. 21, 2017

(51) Int. Cl.
*G06F 3/0481* (2013.01)
*G06F 9/451* (2018.01)
*G06F 17/30* (2006.01)

(52) U.S. Cl.
CPC .......... *G06F 9/453* (2018.02); *G06F 3/04817* (2013.01); *G06F 17/3053* (2013.01)

(58) Field of Classification Search
CPC . G06F 9/4446; G06F 3/04817; G06F 17/3053
See application file for complete search history.

(56) References Cited

U.S. PATENT DOCUMENTS

| | | | |
|---|---|---|---|
| 8,010,910 B2 | 8/2011 | Wright et al. | |
| 8,271,901 B2 | 9/2012 | Gherardi | |
| 8,316,323 B2 | 11/2012 | Saraiya et al. | |
| 2005/0257400 A1 | 11/2005 | Sommerer et al. | |
| 2007/0245264 A1 | 10/2007 | Hoerentrup et al. | |
| 2009/0063517 A1 | 3/2009 | Wright et al. | |

(Continued)

FOREIGN PATENT DOCUMENTS

WO    WO-201400627 A2    6/2014

OTHER PUBLICATIONS

Gube, J.; "Breadcrumbs in Web Design: Examples and Best Practices"; Mar. 17, 2009; 23 pages.

(Continued)

*Primary Examiner* — Anil K Bhargava

(57) ABSTRACT

The present disclosure relates to an interactive system that manages analytics contexts through a series of analytics interactions. The disclosed interactive system receives a selection of an analytics interaction from a user during an interactive analytics session. Then, the system generates a series of analytics interactions by the user during the interactive analytics session. Each analytics interaction represents an analytics context that comprises an analytics interaction, a result, and a reference analytics context. Moreover, the system manages a plurality of analytics contexts by selecting the reference analytics context from previous analytics interactions, or by navigating to a different analytics context, or by deactivating a user-selected analytics context, and presents to the user the series of analytics interactions with the result corresponding to both the selection of the analytics interaction and the reference analytics context. Each analytics interaction in the series of analytics interactions is selectable by the user.

20 Claims, 26 Drawing Sheets

(56) References Cited

U.S. PATENT DOCUMENTS

| | | | |
|---|---|---|---|
| 2011/0246897 A1* | 10/2011 | Lee | G06Q 10/10 |
| | | | 715/735 |
| 2012/0159368 A1 | 6/2012 | Negrillo et al. | |
| 2014/0108379 A1* | 4/2014 | Gotz | G06F 17/30994 |
| | | | 707/722 |
| 2014/0173500 A1 | 6/2014 | Nguyen | |
| 2014/0372924 A1* | 12/2014 | Shih | G06F 3/0484 |
| | | | 715/769 |
| 2015/0082251 A1 | 3/2015 | Lam | |
| 2015/0355817 A1 | 12/2015 | Dai et al. | |
| 2016/0070430 A1* | 3/2016 | Kim | G06F 3/0486 |
| | | | 715/769 |
| 2016/0232464 A1* | 8/2016 | Nonez | G06Q 30/0201 |
| 2016/0373312 A1* | 12/2016 | El-Nasr | H04L 41/22 |
| 2017/0139656 A1* | 5/2017 | Sterling | G06F 3/14 |
| 2017/0244796 A1* | 8/2017 | Liu | G06F 3/0481 |

OTHER PUBLICATIONS

Vietphuong, "ActivePresenter 5.5 Released", Atomi Systems, Inc. Aug. 7, 2015, 5 pages. <https://atomisystems.com/news/activepresenter-5-5-released/.

* cited by examiner

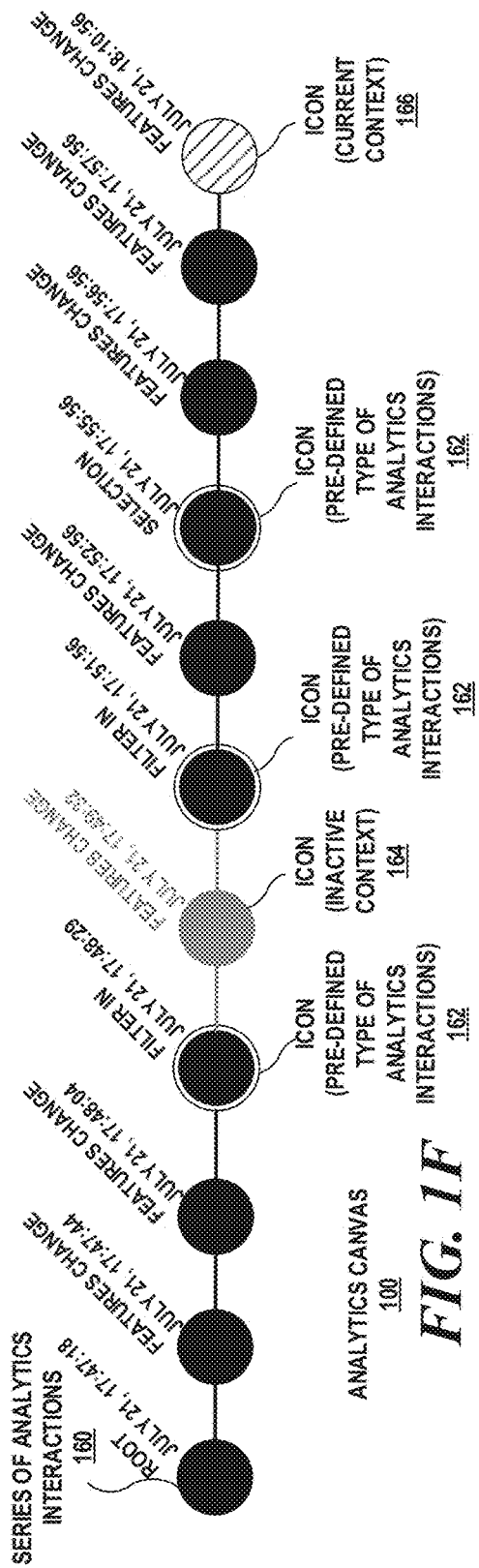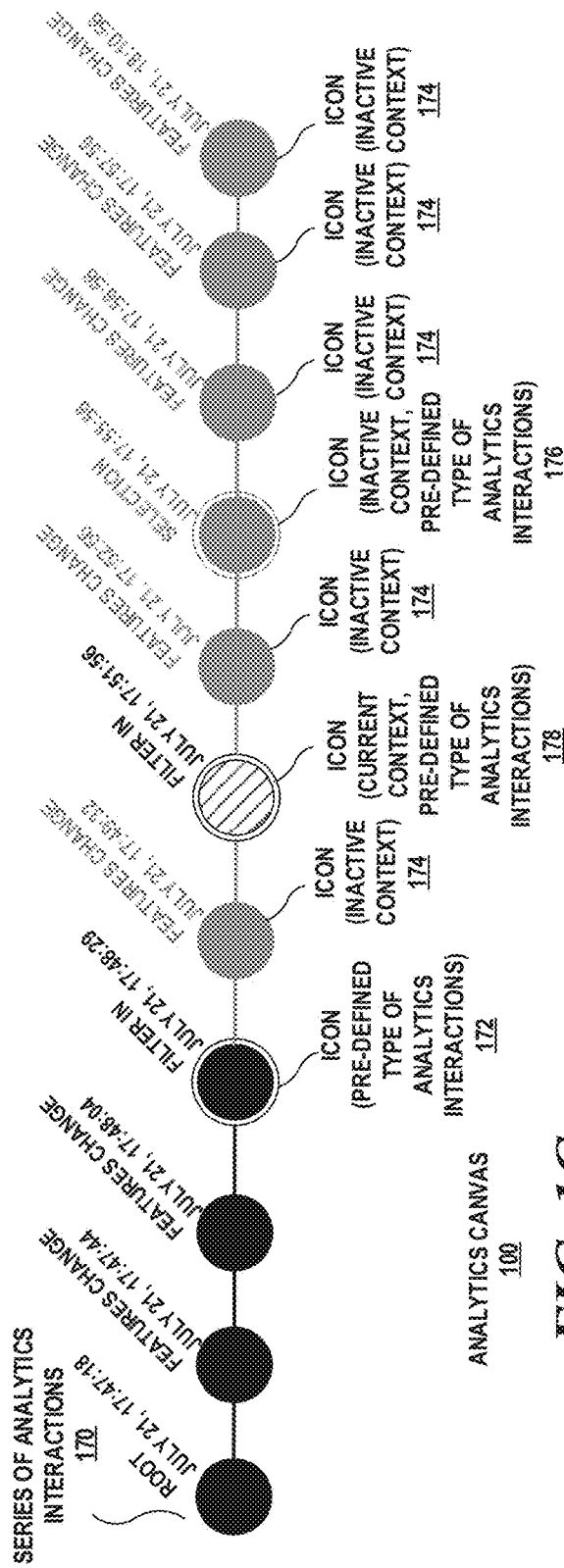

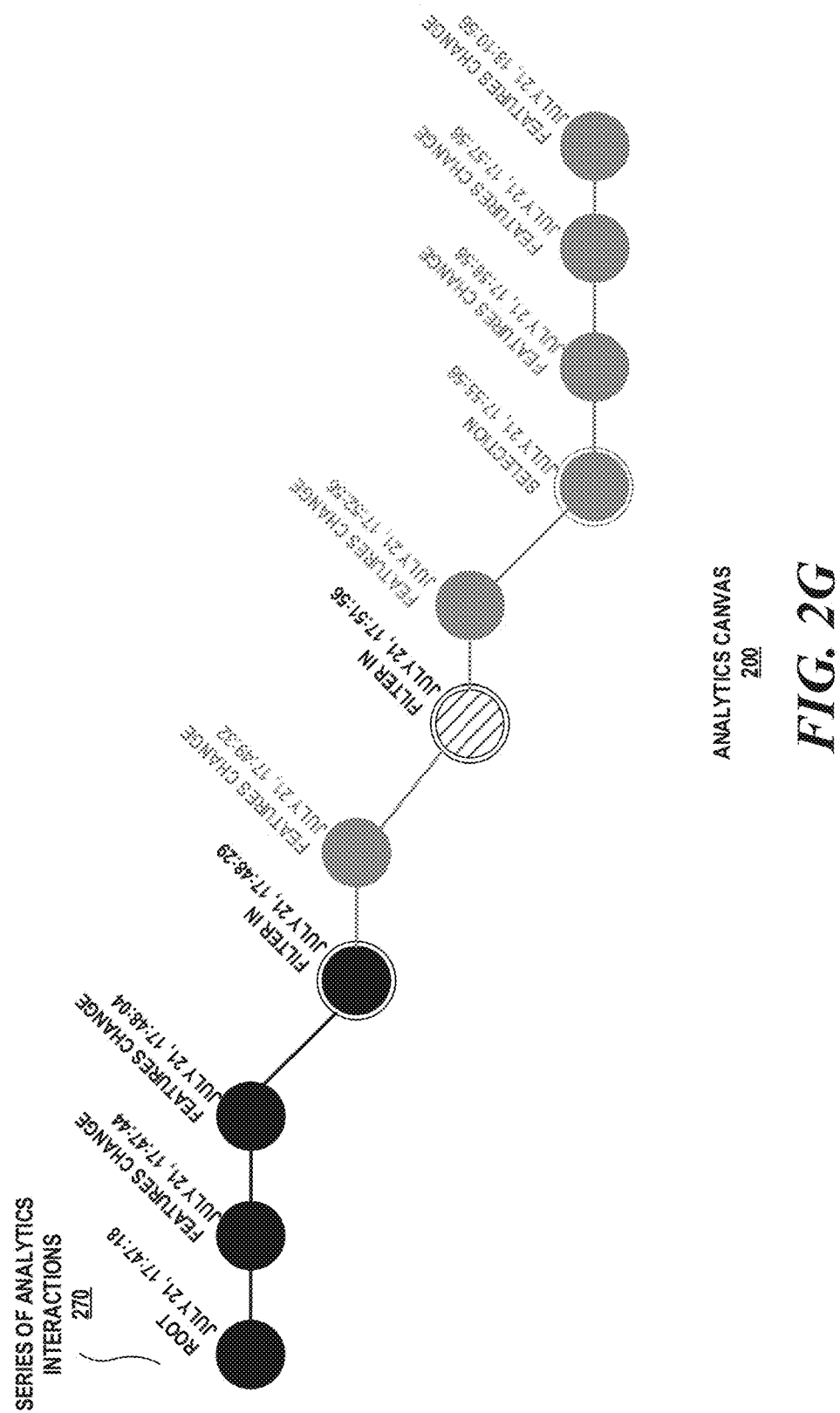

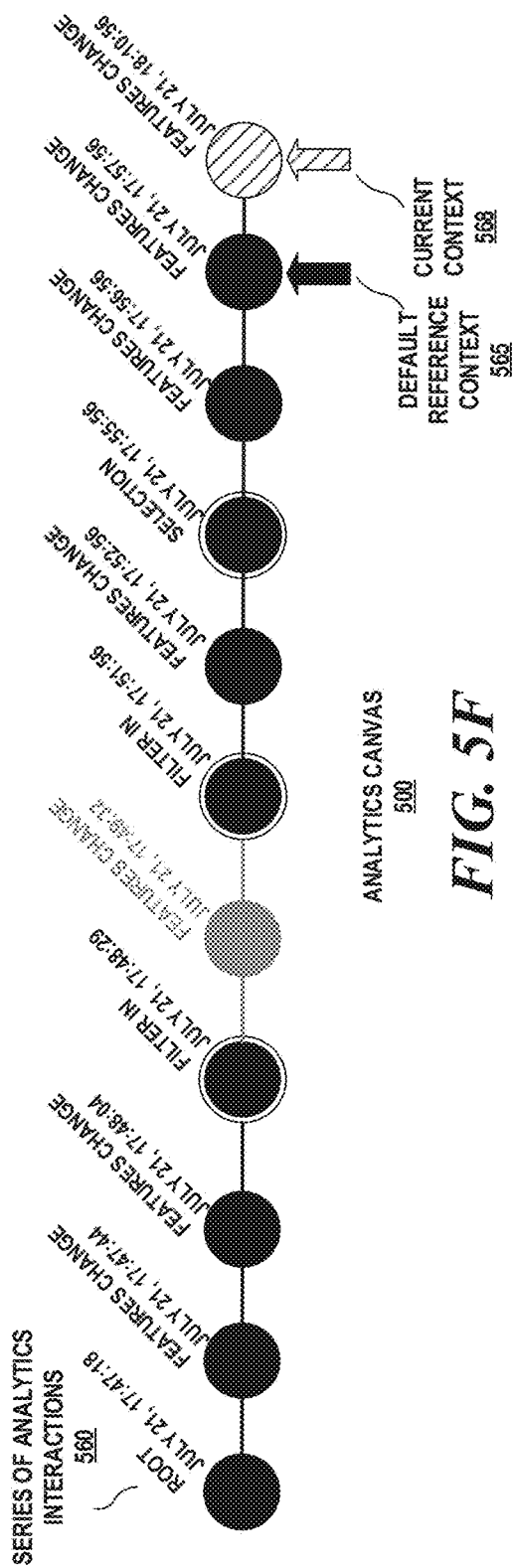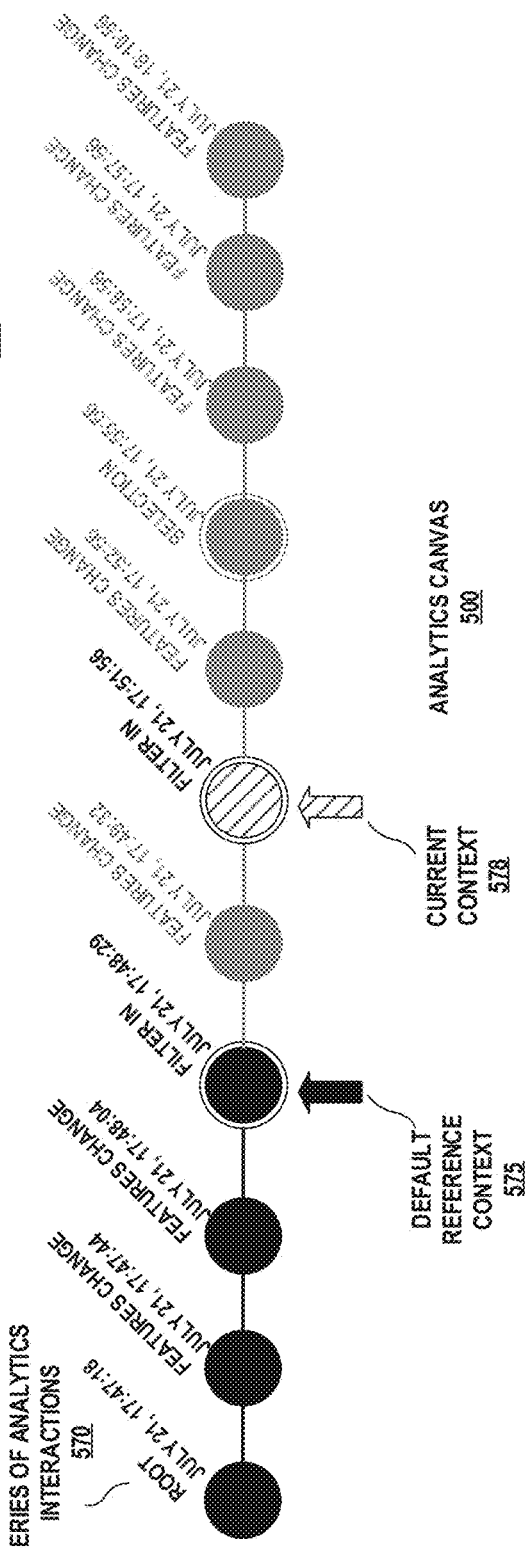

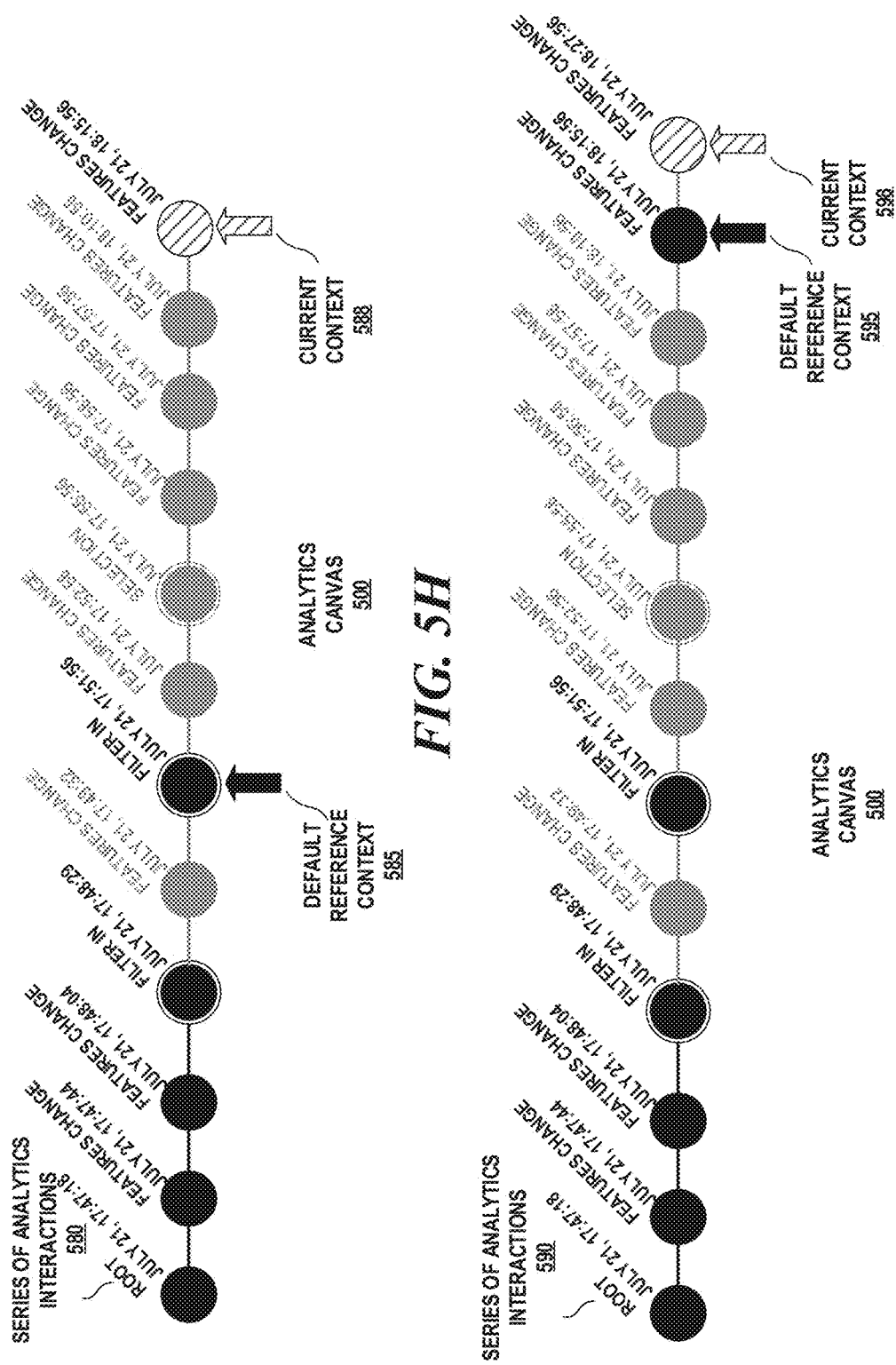

MANAGE ANALYTICS CONTEXTS THROUGH A SERIES OF ANALYTICS INTERACTIONS VIA A GRAPHICAL USER INTERFACE

BACKGROUND

Interactive systems in general share common characteristics. For example, they provide a user with ways to navigate between different system entities or features. Also, they help the user understand what the current state of the system is, and the sequence of previous interactions. However, interactive systems generally only deal with representing a navigation flow through basic entities, such as, folders, web pages, data sets, documents, etc.

BRIEF DESCRIPTION OF THE DRAWINGS

The following detailed description references the drawings, wherein:

FIGS. 1A-1I are block diagrams of an example interactive system to present a series of analytics contexts to a user in a linear form;

FIGS. 2A-2I are block diagrams of an example interactive system to present a series of analytics contexts to a user in a leveled form;

FIGS. 5A-5I are block diagrams of an example interactive system to present a series of analytics contexts with a default reference context to a user;

DETAILED DESCRIPTION

Figure 1A:
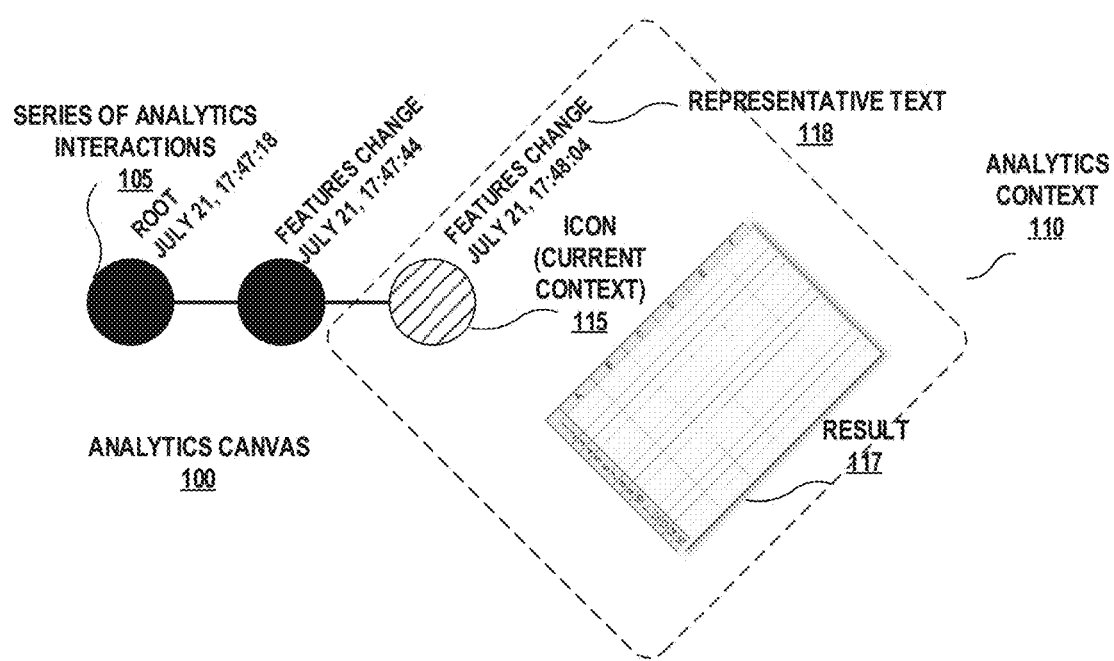

In the following description, details are presented to provide a detailed description. Concepts and techniques disclosed herein can be practiced without specific details, or in combination with other components, etc. As used herein, the term "implementation" generally refers to an implementation that serves to illustrate by way of example but not limitation. It should be understood that this disclosure covers all modifications, equivalents, and alternatives falling within the spirit and scope of the present disclosure.

Overview

The present disclosure relates to analytics context navigation. In particular, the present disclosure relates to managing analytics contexts through a series of analytics interactions via a graphical user interface. Navigational aid tools are generally not utilized beyond basic entities, such as, programs, documents, websites, etc. For example, navigational tools, such as breadcrumbs, are limited to represent recent flow of entities leading to the current entity or state of the system. This type of navigational aid does not provide the needs of complicated interactive analytics systems. On the other hand, users of the interactive analytics system can benefit from navigational tools that provide the users with a visual and intuitive way of accessing, viewing, and navigating through different analytics contexts within the complexity of analytics interactions order and different types of analytics contexts and analytics interactions.

Users of the interactive analytics system can include operations analysts (e.g., security operations analysts), as well as other analysts/managers (e.g., finance, banking, sales, product, and insurance analysts/managers). As these users make use of an interactive analytics system for exploring and understanding their data, the interactive system disclosed herein can help them manage the different analytics contexts that they might create.

Analytics solutions are generally created through complex projects, rather than by means of a computer application. Visual analytics applications not only enable interactions with data visualization, but also provide a medium to interact with the data analytics behind the applications. As described herein, a computer implemented system is disclosed that accesses data and a collection of analytics modules to iteratively provide a sequence of interactive analytics interfaces that are respectively based on selections of data characteristics, and/or results of data analytics. Generally, the term "analytics interface" as used herein describes a user interface for visual representation of results of analytics algorithms. For example, the analytics interface may provide a visual representation of analyzed data, including any identified anomalous events. As another example, the analytics interface may provide a visual representation of clusters of data based on a suitable similarity. In some examples, such visualizations may be progressive (e.g., continually updated as more data is received and/or analyzed). In some examples, the analytics interface includes a navigation tool that helps the users manage and navigate through various analytics contexts.

As described in various examples herein, interactive analytics interfaces based on analytics context modifications are disclosed. One example is a system including a context module and an interaction module. The context module accesses a collection of analytics modules to generate a first analytics interface based on an analytics context characterization. The interaction module provides the first analytics interface to a computing device via a graphical user interface, identifies a requested change in the analytics context characterization via a user interaction with the graphical user interface, and prompts the context module to pause generation of the first analytics interface. The context module modifies the analytics context characterization based on the requested change to create an updated analytics context characterization, and generates a second analytics interface corresponding to the updated analytics context characterization.

Specifically, the navigation tool in the interactive system described herein represents user interactions and how user interactions influence the current analytics context, or analytics results presented to the user. The navigational tool in the interactive system described herein distinguishes between an active analytics context and an inactive analytics context. Moreover, the tools described herein provide navigation back to inactive analytics contexts. Also, they can distinguish between different types of interactions. They enable the analytics interaction, or setting a reference context and its representation. Further, they are usually saved for future processing. The present disclosure provides a user interaction representation in a graphical user interface that complements the interactive analytics system to navigate through different analytics contexts.

The interactive system according to the present disclosure can have any combination of the following features:

First, the interactive system manages and navigates through analytics interactions, rather than entities, such as, page names, or file paths. Therefore, the disclosed interactive system focuses on representing analytics contexts, as opposed to representing a navigation through hierarchically structured entities. Analytics interactions modify analytics contexts, which refer to a set of parameters and conditions used by data analytics engines for computation. Analytics interactions are defined and described in details in the next section.

Second, rather than using a hierarchical list representing the most recent user's path towards current system state, the disclosed interactive system includes an interactive graphical element that represents the history of analytics contexts in an intuitive way with complete series of analytics interactions towards current system state.

Third, the disclosed interactive system provides a way to navigate to any past analytics context (e.g., jump back) without removing the current context from the representation. When this feature is activated, the past analytics context becomes the current context, discarding the effect of analytics interactions that were created after that particular past analytics context. Thus, when a user jumps back to a particular past analytics context, the analytics contexts that are created after that particular past analytics context are represented as inactive contexts. Inactive contexts can be represented in a different style, e.g., by using a different color, size, shade, pattern, etc. The user can still easily navigate back to the inactive contexts, as they are included in the representation. Note that the inactive contexts may be hidden and may be expanded when the user hover the mouse over or click on an element.

Fourth, the disclosed interactive system automatically represents the default reference context. Reference context generally refers to a particular past analytics context to which the current analytics context is compared to. As such, the choice of reference context has a direct influence on the state of current context. The disclosed interactive system represents the default reference context correctly on top of the list of other analytics interactions regardless whether the analytics interactions are visible or hidden (as in the inactive analytics interactions).

Fifth, the disclosed interactive system provides ways for the user to choose and set user-selected reference context. The user-selected reference context refers to a particular past analytics context to which the current analytics context is compared to. The user-selected reference context is different from the default reference context. The disclosed interactive system can represent the user-selected reference context on top of the list of other analytics interactions.

Sixth, the disclosed interactive system can visually represent different analytics interactions in different ways to emphasize their meaning and the context following each analytics interaction. For example, in some implementation, the series of analytics contexts are presented in a linear form. In other implementations, the series of analytics contexts are presented in a leveled form (e.g., in a tree-like view). Also, the disclosed interactive system can use different ways to present inactive contexts. For example, they can be grayed out or hidden.

Last but not least, the disclosed interactive system automatically saves a series of analytics interactions and their corresponding context representation for the current interactive analytics session. The user can upload the series of analytics interactions and their corresponding context representation later and continue working on that flow.

Example Analytics Interactions

Considering an interactive analytics system that receives as an input a dataset, usually in the form of a table, and applies a number of analytics modules on this dataset (e.g., anomaly detection, clustering, correlation discovery, anomalous entities, characterization, classification, etc.), each yielding a set of analytic results. The analytic results depend on an analytics context. This analytics context defines parameters and conditions used by the analytics within their computations. In an interactive analytics system, the analytics context can be modified by the user via analytics interactions. Throughout this disclosure, context and analytics contexts are used interchangeably.

The different analytics interactions available to the user include:

(1) Feature Selection: The user can determine the different analytics features by choosing dataset columns. The user can determine which features will take part in the analytics. Each selected column is considered a "feature" by the analytics.

(2) Derived Features: Some of the analytic features can be derived from the dataset columns by pre-specified functions. For example, if a column contains record dates, a derived feature can be the corresponding year. The user can determine which derived features will take part in the analytics.

(3) Features' Weight Change: The user can change the weights corresponding to a feature. By doing so, the user determines that some features are more important than other features. The changed features weights can be either dataset columns or derived features.

(4) Result feedback: The user may associate some of the analytic results to a grade or other types of feedback, such as, "like" or "dislike."

(5) Filter In: The user may choose to focus on a particular set of analytic results, such as, a given cluster, entity, or anomaly. This is translated into an inclusive filter, which shows only the records associated to the focused results.

(6) Filter out: Similar to Filter In, the user may choose to filter out records. This is translated into an exclusive filter, which does not show any records associated with the excluded results.

(7) Selection: The user may select an individual record or a set of individual records that satisfy certain criteria.

Furthermore, some analytics modules require a reference analytics context (the default reference context is the last active analytics context in the series of analytics interactions before the current active context). These analytics modules compare the data in the current analytics context to the reference analytics context, and thereby providing differential analysis.

After each and every interaction being performed by the user, a new analytics context is created, assimilating all the characteristics of the previous analytics context plus the additional analytics interaction. The disclosed interactive system provides the user with a tool to manage the above-described analytics contexts. Here, "manage" generally refers to the ability to readily see and comprehend current and past analytics contexts, navigate between such analytics contexts, set reference analytics contexts, save and load session analytics contexts, etc.

The different operations that may be available to the user for analytics context management include at least the followings:

(1) Performing an analytics interaction at a time, whereas each analytics interaction creates a new analytics context.

(2) Navigating back to a previous analytics context, which renders the current analytics context inactive and all the skipped contexts during the navigation back are automatically inactivated. Alternatively, deactivating a user-selected analytics context (3) Re-activating any inactive analytics context. A user can select to go to any analytics context in the context history, and relevant contexts along the history path would be automatically de-activated or re-activated.

(4) Choosing a reference context.

(5) Storing a context history automatically.

(6) Loading a previously stored context history.

For illustration purposes only, the context interface may be referred to as "superposition breadcrumbs." The series of analytics contexts shown in Table 1 below are used to describe the above features in more details.

TABLE 1

Example series of analytics contexts during an interactive analytics session.

| Step Number | Analytics Interaction Name | Timestamp | Notes |
|---|---|---|---|
| 1 | Root | Jul. 21, 17:47:18 | Starting the interactive analytics process. |
| 2 | Features Change | Jul. 21, 17:47:44 | |
| 3 | Features Change | Jul. 21, 17:48:04 | |
| 4 | Filter In | Jul. 21, 17:48:29 | The number of cases is reduced. |
| 5 | Features Change | Jul. 21, 17:49:32 | |
| 6 | Jump back to Step 4 | | |
| 7 | Filter In | Jul. 21, 17:51:56 | The number of cases is reduced to the number of cases in some selected group. |
| 8 | Features Change | Jul. 21, 17:52:56 | |
| 9 | Selection | Jul. 21, 17:55:56 | The number of cases is reduced to the number of cases in some user defined selection group. |
| 10 | Features Change | Jul. 21, 17:56:56 | |
| 11 | Features Change | Jul. 21, 17:57:56 | |
| 12 | Features Change | Jul. 21, 18:10:56 | |
| 13 | Jump back to Step 7 | | |
| 14 | Features Change | Jul. 21, 18:15:56 | |
| 15 | Features Change | Jul. 21, 18:27:56 | |

Representation of Analytics Contexts in Linear Form

FIGS. 1A-1I are block diagrams of an example interactive system to present a series of analytics contexts to a user in a linear form. Specifically, FIGS. 1A-1I each includes an analytics canvas 100. Analytics canvas 100 is used to display to the user, via a graphical user interface, a tool for managing and navigating analytics contexts described in the section above. In particular, analytics canvas 100 includes at least a series of analytics interactions. For example, in FIG. 1A, a series of analytics interactions 105 includes three icons. Each analytics context (e.g., analytics context 110) is visually represented by an icon, such as, a circle or other visual form (e.g., icon 115), plus a representative text (e.g., representative text 118) and a result of data (e.g., result 117). Representative text 118 may include the name of the analytics interaction, a timestamp, and additional details about the performed analytics interaction. The additional details may have many lines. In some implementations, the additional details (e.g., result 117) can be presented only when the user hovers over the representative geometrical figure (e.g., icon 115) or text (e.g., representative text 118).

Some of the analytics interactions (e.g., Filter In, Filter Out, and Selection) can be represented by a different geometrical figure, to distinguish them from the other actions. The set of analytics interactions being represented by a different format can be pre-defined by a user of the disclosed interactive system. In addition, visual differentiation for predefined type of analytics interactions could be achieved by other means of visualization methods, e.g., colors, shades, patterns, adding some adjacent icon on top of the existing icon, etc.

FIGS. 1A-1I generally show examples of superposition breadcrumbs in a linear list after completing certain analytics interactions in Table 1 described above. In the illustrations shown in FIGS. 1A-1I, the icon corresponding to a current analytics context is filled with a diagonal pattern, while active analytics contexts are colored in solid black and inactive analytics contexts are colored in grey. However, the disclosed interactive system can use icons with different colors, different fill patterns, different shapes, different shade effects, different outline effects, different highlights, etc., to distinguish between a current analytics context, a previous analytics context, an active analytics context, an inactive analytics context, a pre-defined type of analytics interactions, a default reference analytics context, a user-selected reference analytics context, and so on.

FIG. 1A shows an example superposition breadcrumbs linear list after applying analytics interactions through step 3 illustrated in Table 1. In FIG. 1A, icon 115 in a series of analytics interactions 105 is filled with a diagonal pattern, indicating that icon 115 corresponds to a current analytics context.

Figure 1B:
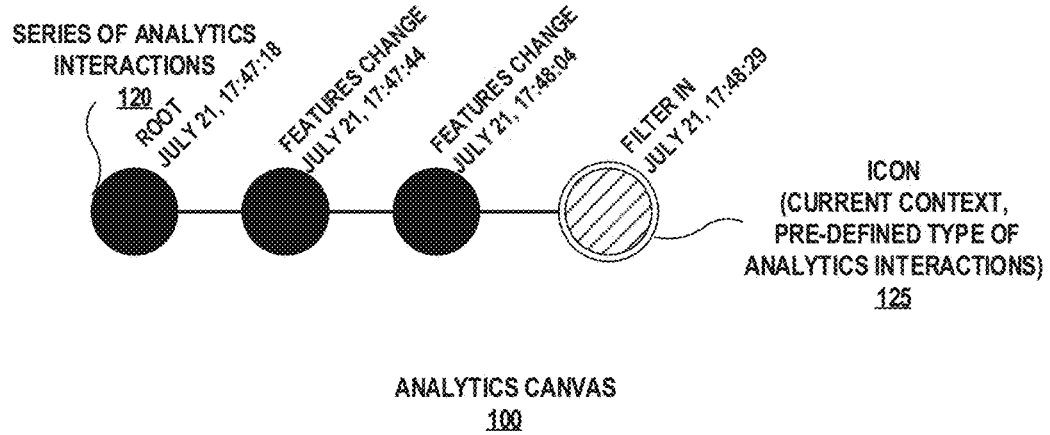
Figure 1C:
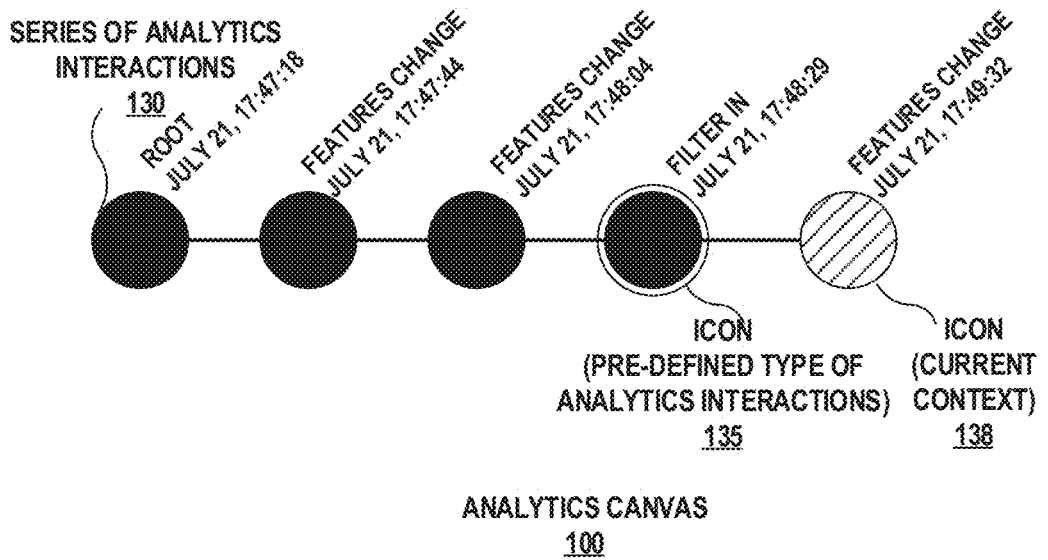

Moreover, FIG. 1B shows an example superposition breadcrumbs linear list after applying analytics interactions through step 4 illustrated in Table 1. In FIG. 1B, a series of analytics interactions 120 includes an icon 125, which not only is filled with a diagonal pattern, but also has a double circle. By filling icon 125 with the diagonal pattern, analytics canvas 100 indicates to the user that icon 125 corresponds to a current analytics context. On the other hand, by drawing a double circle around icon 125, analytics canvas 100 indicates to the user that icon 125 corresponds to a pre-defined type of analytics interactions. Here, assuming that the pre-defined type of analytics interactions includes the analytics interactions of Filter In, Filter Out, and Selection as selected by the user. Because icon 125 corresponds to the analytics interaction of Filter In, unlike the other icons shown in a series of analytics interactions 120, icon 125 represents a pre-defined type of analytics interactions. Therefore, by combining different icon styles together, icons in a series of analytics interactions can represent any combinations of analytics context types.

FIG. 1O shows an example superposition breadcrumbs linear list after applying analytics interactions through step 5 illustrated in Table 1. Note that in a series of analytics interactions 130 shown in FIG. 1O, icon 135 represents a Filter In interaction at July 21, 17:48:29, which is a past but active pre-defined type of analytics interactions. Therefore, icon 135 is colored in solid black, which indicates an active analytics context, and includes a double circle, which indicates a pre-defined type of analytics interactions. By contrast, icon 138 represents a Features Change interaction at July 21, 17:49:32, which is not a pre-defined type of analytics interactions. As such, icon 138 does not include a double circle. However, because icon 138 corresponds to a current analytics context, icon 138 is filled with diagonal pattern.

Figure 1D:
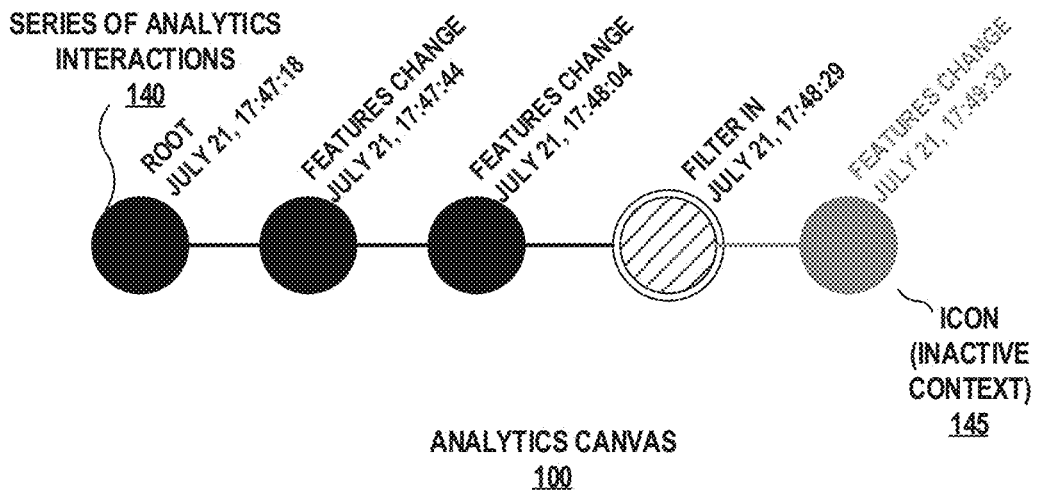

FIG. 1D shows an example superposition breadcrumbs linear list after applying analytics interactions through step 6 illustrated in Table 1 above. Note that the analytics interaction in step 6 jumps back to step 4. Therefore, the analytics interaction of Filter In at July 21, 17:48:29 (e.g., the analytics interaction of step 4) becomes the current analytics context. The Features Change in step 5 is skipped by the jump back interaction in step 6. Therefore, icon 145 in a series of analytics interactions 140 corresponding to Features Change in step 5 now becomes inactivated. As such, icon 145 is presented to the user in grey color.

Figure 1E:
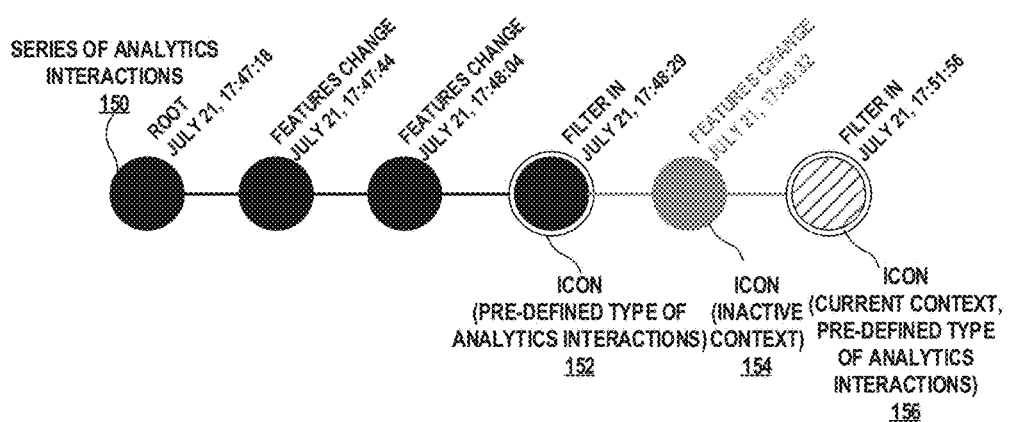

FIG. 1E shows an example superposition breadcrumbs linear list after applying analytics interactions through step 7 illustrated in Table 1. Here, a subsequent Filter In interaction at July 21, 17:51:56 is applied after an initial Filter In interaction in step 4. This subsequent interaction causes the analytics context corresponding to icon 152 to be an active context and the analytics context corresponding to icon 156 to be a current context. Therefore, icon 152 in a series of analytics interactions 150 includes a double circle (indicating that icon 152 represents a pre-defined type of analytics interactions) and is colored in black (indicating that icon 152 represents an active context). By contrast, icon 154 is colored in grey, indicating that icon 154 represents an inactive context. Moreover, icon 156 includes a double circle (indicating that icon 156 represents a pre-defined type of analytics interactions) and is filled with diagonal pattern (indicating that icon 156 represent a current context).

FIG. 1F shows an example superposition breadcrumbs linear list after applying analytics interactions through step 12 illustrated in Table 1. Here, similar to FIGS. 1A-1E, a series of analytics interactions 160 includes a variety of icons, such as, icon 162 representing a pre-defined type of analytics interactions, icon 164 representing an inactive context, icon 166 representing a current context, etc. As illustrated in FIG. 1F, except for the icon corresponding to step 5, all other icons in a series of analytics interactions 160 correspond to either active or current contexts.

FIG. 1G shows an example superposition breadcrumbs linear list after applying analytics interactions through step 13 illustrated in Table 1. Because step 13 includes analytics interaction of jumping back to step 7, icon 178 corresponding to the analytics interaction of Filter In at July 21, 17:51:56 in step 7 now becomes the current context. As such, icon 178 is filled with a diagonal pattern. Because steps 8-12 are skipped, the icons in a series of analytics interactions 170 that correspond to those steps (e.g., icons 174) are colored in grey, indicating that they are inactive contexts. Note that, if an inactive context corresponds to a pre-defined type of analytics interactions, then the icon (e.g., icon 176) will include a double circle in grey color. Likewise, if an active context corresponds to a pre-defined type of analytics interactions, then the icon (e.g., icon 172) will include a double circle in black color.

Figure 1H:
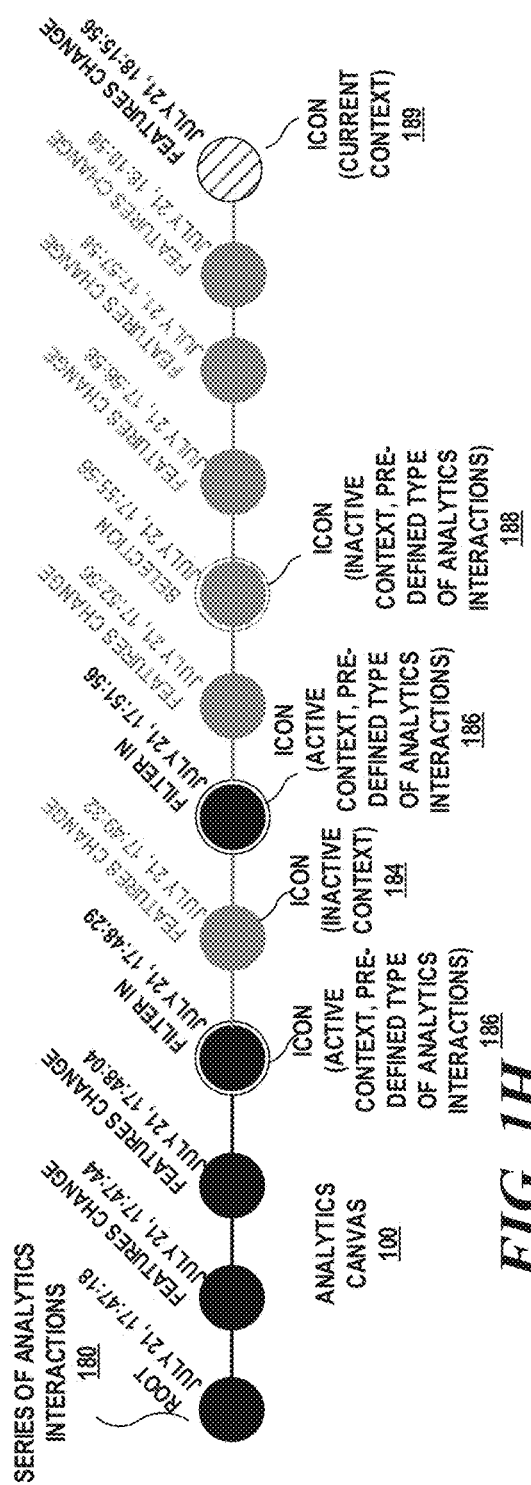

FIG. 1H shows an example superposition breadcrumbs linear list after applying analytics interactions through step 14 illustrated in Table 1. Here, step 14 corresponds to an analytics interaction of Features Change at July 21, 18:15:56. Therefore, in a series of analytics interactions 180, the last current context (e.g., icon 178 in FIG. 1G) becomes an active context (as represented by icon 186), and a new analytics context (as represented by icon 189) is created to represent the current analytics context in FIG. 1H. Moreover, FIG. 1H also includes icon 184 corresponding to an inactive context, icon 186 corresponding to an active pre-defined type of analytics interactions, icon 188 corresponding to an inactive pre-defined type of analytics interactions, etc.

Figure 1I:
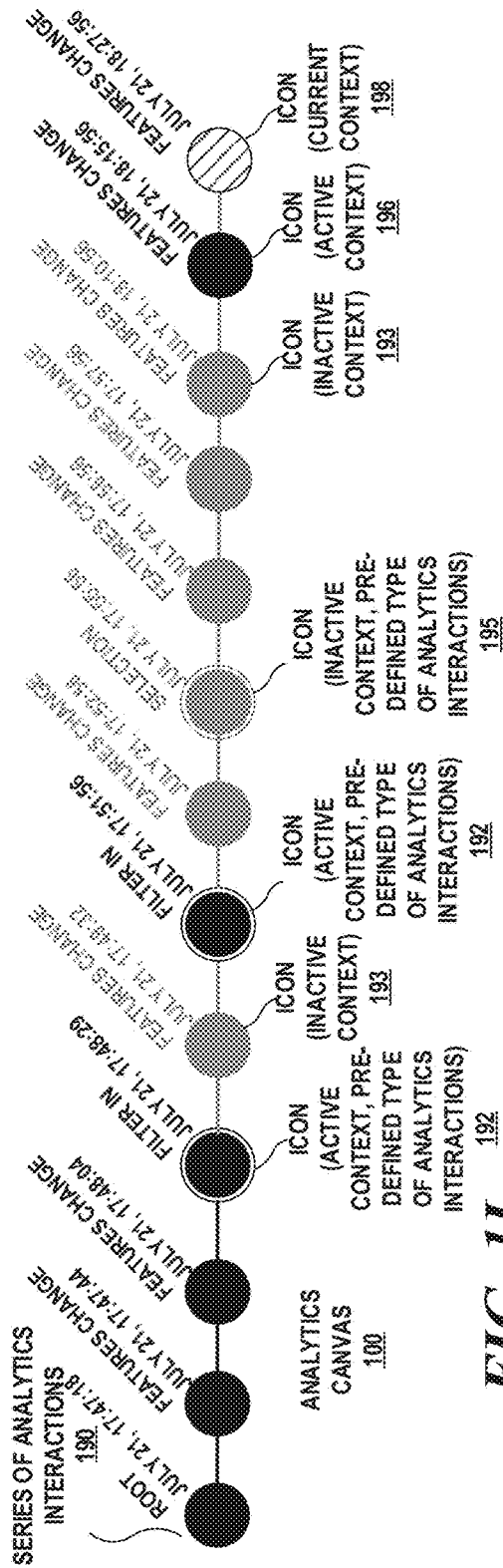

FIG. 1I shows an example superposition breadcrumbs linear list after applying analytics interactions through step 15 illustrated in Table 1. Here, step 15 corresponds to an analytics interaction of Features Change at July 21, 18:27:56. Therefore, in a series of analytics interactions 190, the last current context (e.g., icon 189 in FIG. 1H) becomes an active context (e.g., icon 196), and a new analytics context (as represented by icon 198) is created to represent the current analytics context in FIG. 1I. Moreover, like in the previous figures, FIG. 1I also includes icon 192 corresponding to an active pre-defined type of analytics interactions, icon 193 corresponding to an inactive context, icon 195 corresponding to an inactive pre-defined type of analytics interactions, icon 196 corresponding to an active context, icon 198 corresponding to a current context, etc.

Representation of Analytics Contexts in Leveled Form

FIGS. 2A-2I are block diagrams of an example interactive system to present a series of analytics contexts to a user in a leveled form. Generally, FIGS. 2A-2I show examples of superposition breadcrumbs in a leveled list after applying certain analytics interactions in Table 1 described above. Specifically, FIGS. 2A-2I each includes an analytics canvas 200. Analytics canvas 200 is used to display to the user, via a graphical user interface, a tool for managing and navigating analytics contexts described in the section above. In particular, analytics canvas 200 includes at least a series of analytics interactions.

Figure 2A:
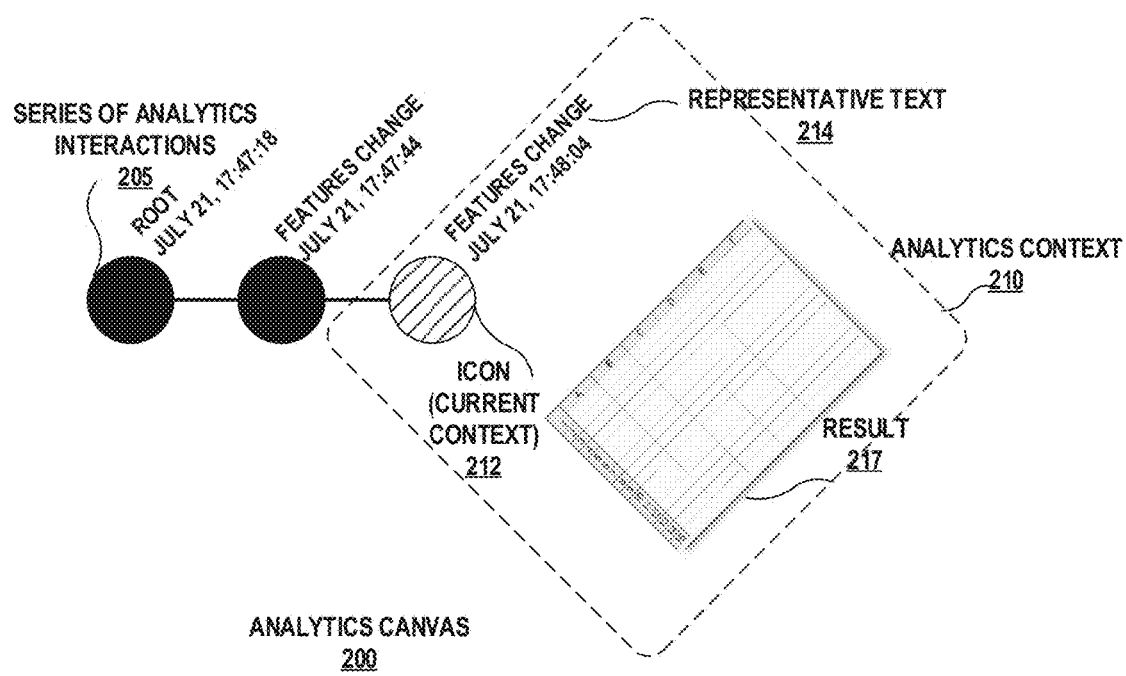

Here, FIG. 2A shows an example superposition breadcrumbs leveled list after applying analytics interaction steps 1-3 illustrated in Table 1. A series of analytics interactions 205 in FIG. 2A includes three icons, each corresponds to an analytics context. Each analytics context (e.g., analytics context 210) is visually represented by an icon, such as, a circle or other visual form (e.g., icon 212), plus a representative text (e.g., representative text 214) and a result of data (e.g., result 217). Representative text 214 may include the name of the analytics interaction, a timestamp, and additional details about the performed analytics interaction. The additional details may have many lines. In some implementations, the additional details (e.g., result 217) can be presented only when the user hovers over the representative geometrical figure (e.g., icon 212) or text (e.g., representative text 214).

Figure 2B:
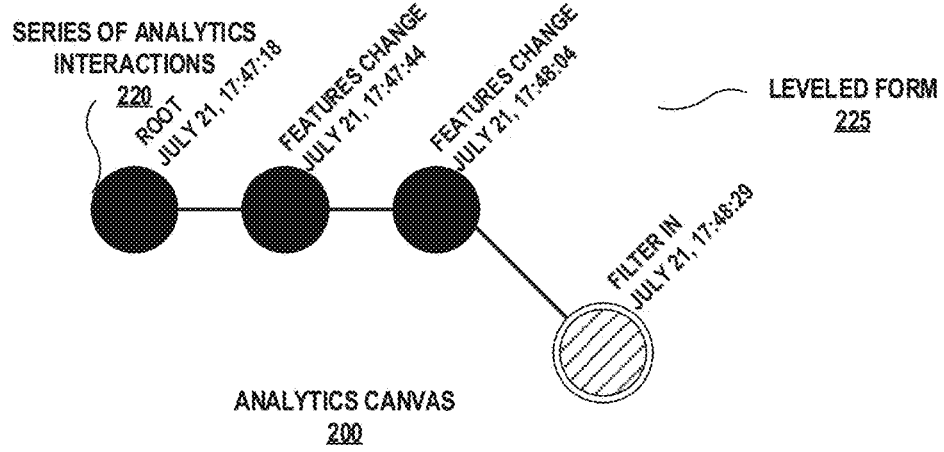

FIG. 2B shows an example superposition breadcrumbs leveled list after applying analytics interaction steps 1-4 illustrated in Table 1. Note that a series of analytics interactions 220 in FIG. 2B is presents the analytics contexts in a leveled form 225, whereas a branch down occurs (and thus a new level is created) whenever the current analytics interaction is a pre-defined type of analytics interactions. Although pre-defined type of analytics interactions is used as a rule for creating new level in this example, other rules can be used to present the series of analytics interactions in a leveled form on analytics canvas 200.

Figure 2C:
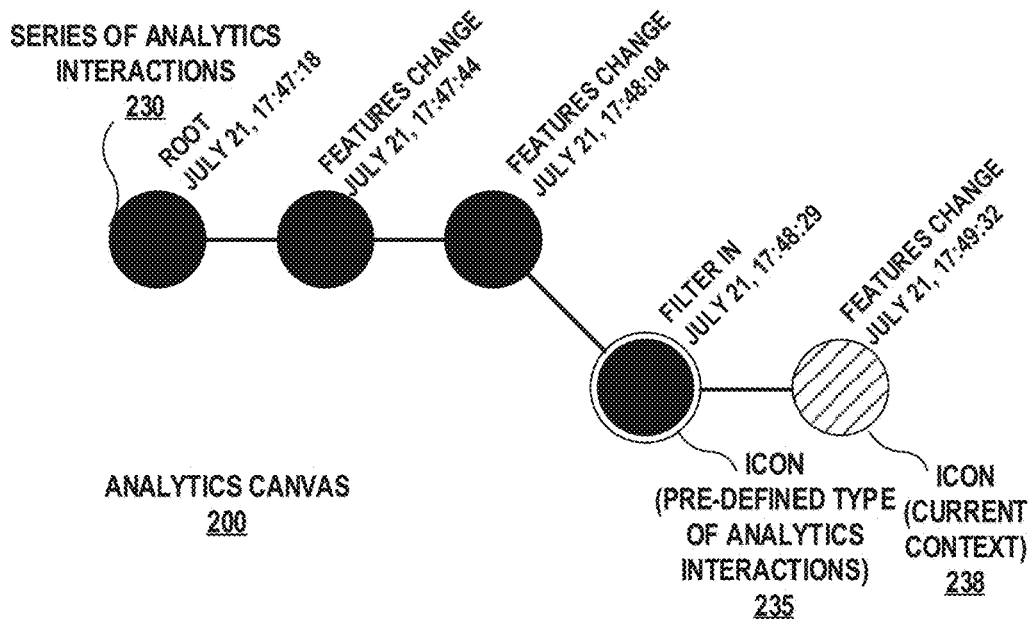

FIG. 2C shows an example superposition breadcrumbs leveled list after applying analytics interaction steps 1-5 illustrated in Table 1. Here, a series of analytics interactions 230 includes two levels. The second level starts with icon 235, which corresponds to a pre-defined type of analytics interactions (e.g., Filter In interaction). Icon 238 is filled with diagonal pattern because it corresponds to a current context. In this example, the pre-defined type of analytics interactions includes Filter In, Filter Out, and Selection. However, other functions may be included or excluded as well. This tree-like view emphasizes these analytics interactions, and has a more powerful visual representation of the type of analytics interactions. For example, a new level may correspond to a change in the scope of data, the number of selected records, the type of selected records, etc. Thus, the leveled form makes it easier for users to comprehend the meaning and consequences of the analytics interactions.

Figure 2D:
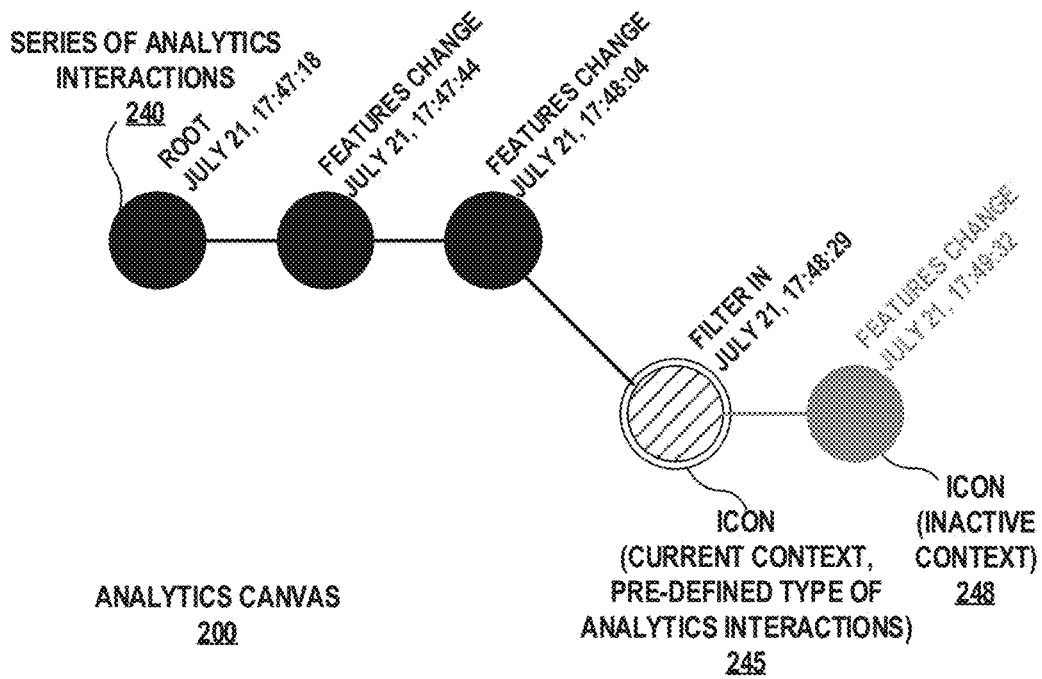

FIG. 2D shows an example superposition breadcrumbs leveled list after applying analytics interaction steps 1-6 illustrated in Table 1. The analytics interaction in step 6 includes a jump back to step 4. Therefore, icon 245 in action list 240 corresponding to Filter In at July 21, 17:48:29 as applied in step 4 now becomes the current context corresponding to a pre-defined type of analytics interactions. As such, icon 245 is filled with diagonal pattern and includes a double circle. On the other hand, icon 248 represents the analytics interaction in step 5, which is skipped. Therefore, icon 248 is colored in grey, indicating that it corresponds to an inactive context.

Figure 2E:
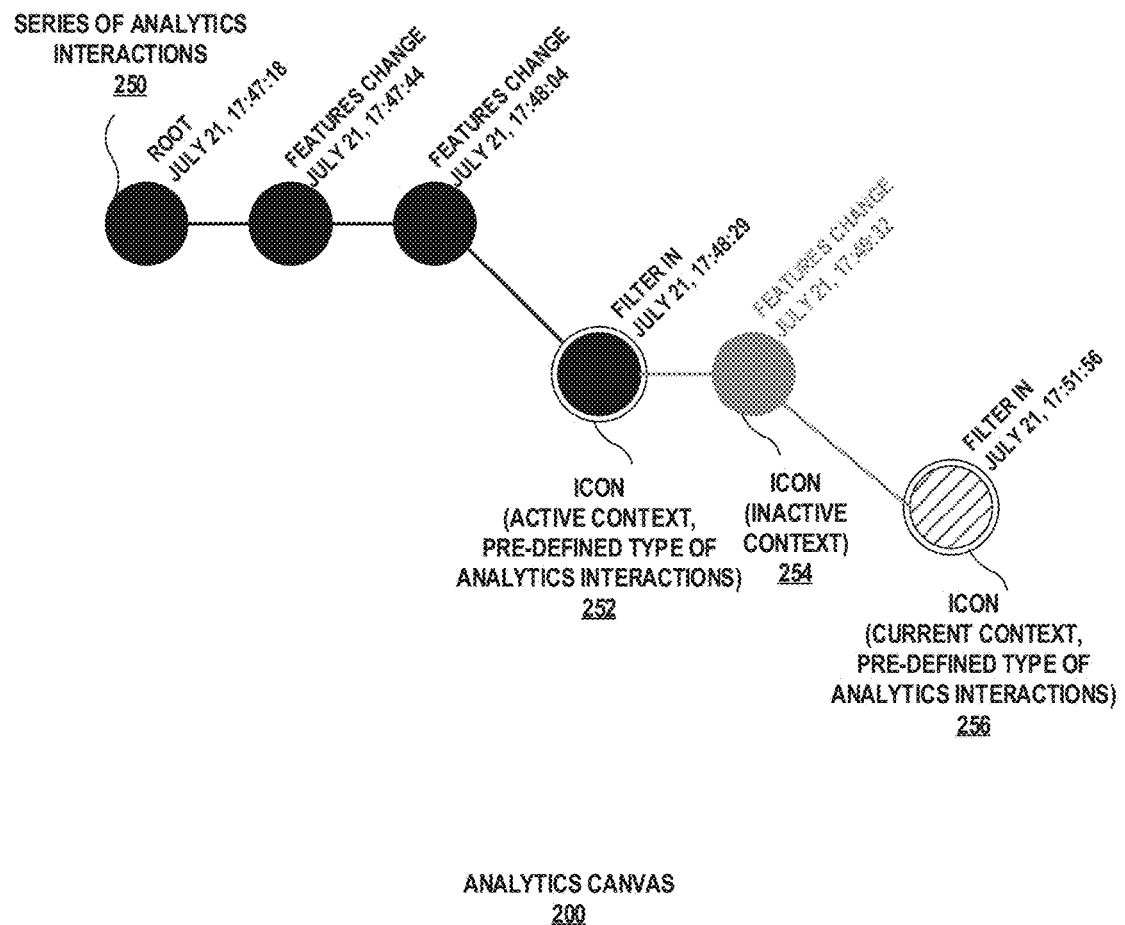

FIG. 2E shows an example superposition breadcrumbs leveled list after applying analytics interaction steps 1-7 illustrated in Table 1. Here, a subsequent Filter In interaction at July 21, 17:51:56 is applied after an initial Filter In interaction in step 4. Therefore, both step 4 and step 7 correspond to a pre-defined type of analytics interactions. As such, icon 252 and icon 256 in action list 250 include a double circle. Moreover, icon 252 and icon 256 each starts a new level in action list 250, emphasizing the change in data resulting from the Filter In interactions in these steps.

Figure 2F:
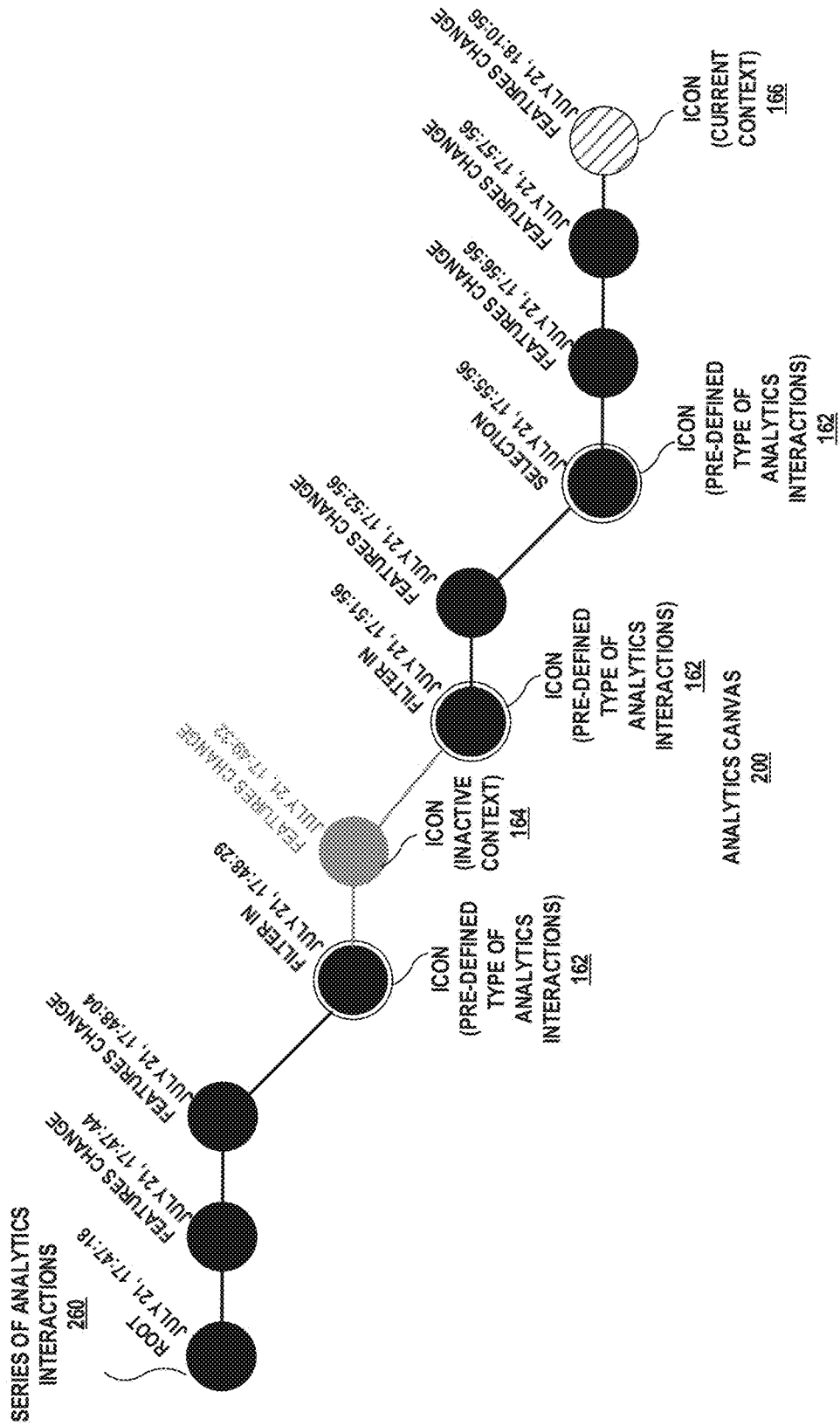

FIG. 2F shows an example superposition breadcrumbs leveled list after applying analytics interaction steps 1-12 illustrated in Table 1. Except for the icon corresponding to step 5, other icons in action list 160 correspond to either active or current contexts. Therefore, the other icons are either colored in black or filled with diagonal pattern. Note that icons 162 each corresponds to a pre-defined type of analytics interactions (e.g., Filter In or Selection). Therefore, each icon 162, in addition to including a double circle, starts a new level in a series of analytics interactions 260. Further, an inactive context is represented by icon 164 that is colored in grey; and, a current context is represented by icon 166 that is filled with a diagonal pattern.

FIG. 2G shows an example superposition breadcrumbs leveled list after applying analytics interaction steps 1-13 illustrated in Table 1. Because step 13 in Table 1 includes analytics interaction of jumping back to step 7, the icon corresponding to the analytics interaction of Filter In at July 21, 17:51:56 in step 7 becomes the current context. As such, this icon is filled with a diagonal pattern. Because steps 8-12 are skipped, the icons in a series of analytics interactions 270 that correspond to those steps are colored in grey, indicating that they are inactive contexts. Note that, if an inactive context corresponds to a pre-defined type of analytics interactions, then the icon will include a double circle in grey color. If an active context corresponds to a pre-defined type of analytics interactions, then the icon will include a double circle in black color. Either way, the icon representing a pre-defined type of analytics interactions will start a new level in a series of analytics interactions 270.

Figure 2H:
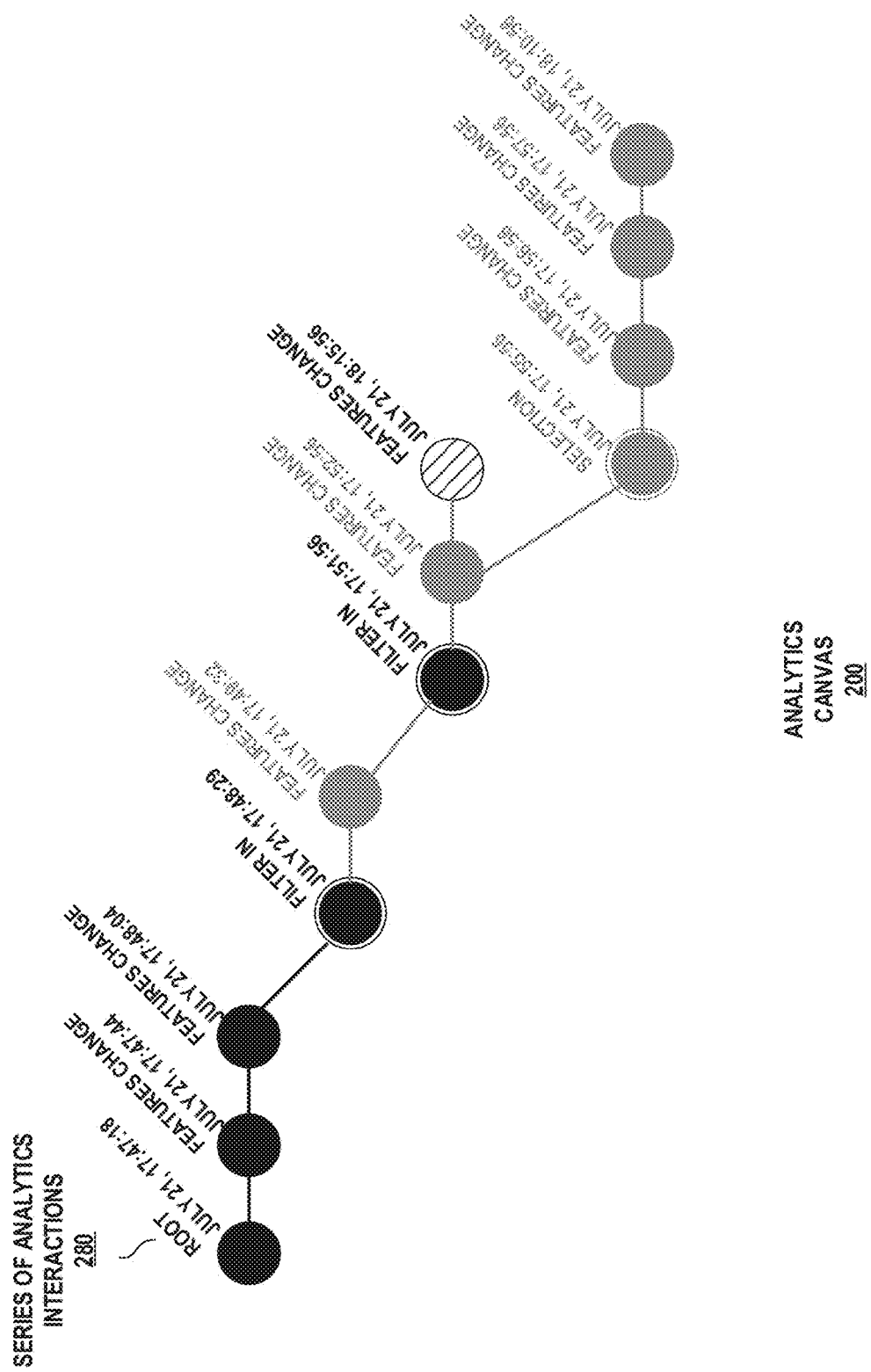

FIG. 2H shows an example superposition breadcrumbs leveled list after applying analytics interaction steps 1-14 illustrated in Table 1. Here, step 14 corresponds to an analytics interaction of Features Change at July 21, 18:15:56. Therefore, in a series of analytics interactions 280, the last current context (e.g., the icon corresponding to Filter In at July 21, 17:51:56) becomes an active context, and a new analytics context, as represented by the icon corresponding to Features Change at July 21, 18:15:56, is created to represent the current analytics context. Other skipped icons during jump back in step 13 remain to be colored in grey, indicating that they are inactive contexts. Because Features Change is not a pre-defined type of analytics interactions in this example, the icon corresponding to the current context stays in the same level as the last active context.

Figure 2I:
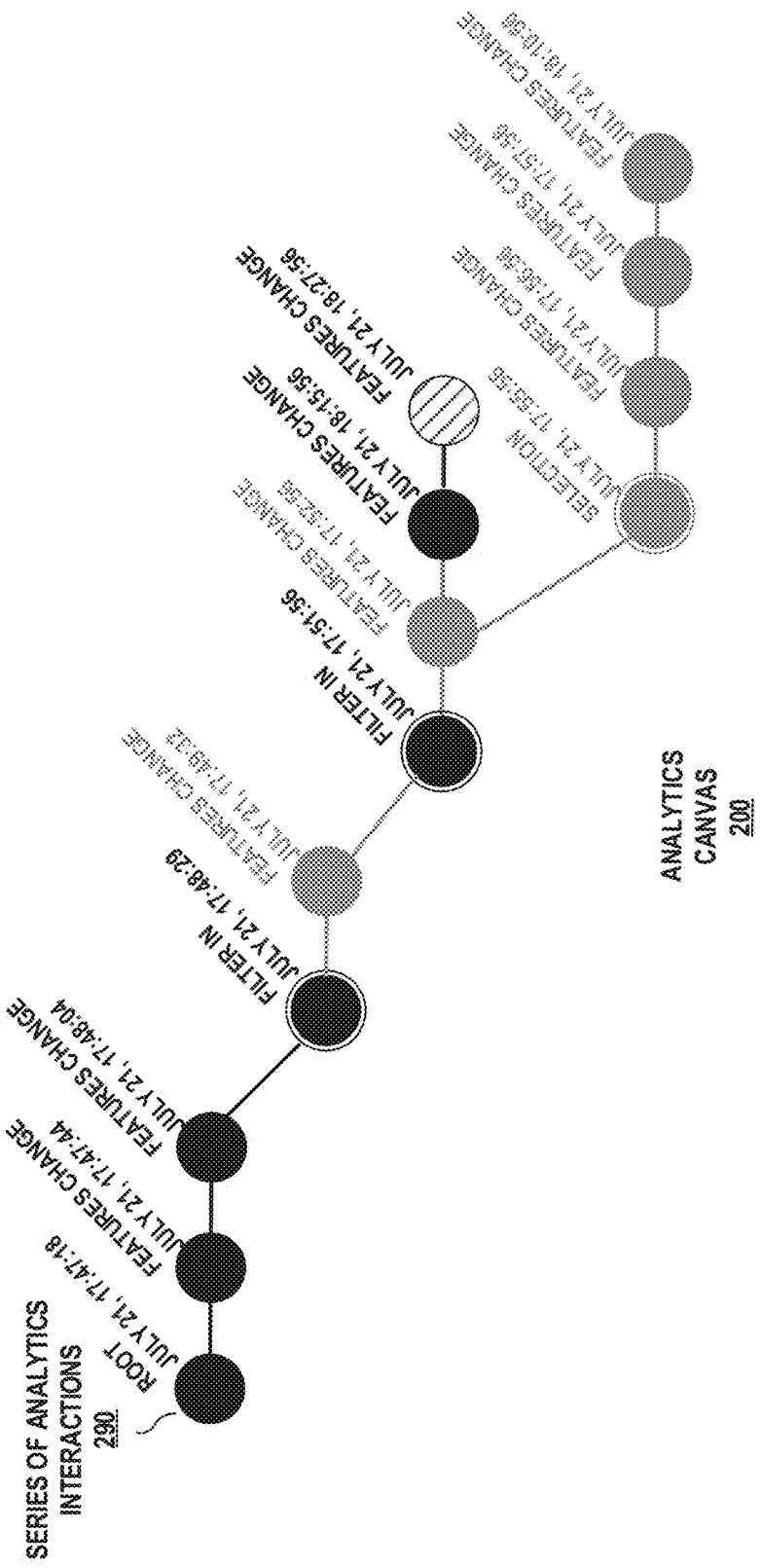

FIG. 2I shows an example superposition breadcrumbs leveled list after applying analytics interaction steps 1-15 illustrated in Table 1. Here, step 15 corresponds to an analytics interaction of Features Change at July 21, 18:27:56. Therefore, in a series of analytics interactions 290, the last current context corresponding to Features Change at July 18:15:56 becomes an active context, and a new analytics context, corresponding to Features Change at July 21, 18:27:56, is created to represent the current analytics context in FIG. 1I. Because Features Change is not a pre-defined type of analytics interactions in this example, the icon corresponding to the current context stays in the same level as the last active context, instead of starting a new level.

As shown in FIGS. 1A-1I and 2A-2I, this a series of analytics interactions is updated after each analytics interaction. The disclosed interactive system generates a new representation for an analytics context (or analytics interactions which in turn represent the analytics contexts) created in each step and attaches the newly generated representation to the previous series of analytics interactions.

The user can use the superposition breadcrumbs list disclosed herein to jump back to some previous context, or jump forward over one or several previous contexts. For example, the user can click on a previous context he/she desires to jump back to in order to navigate there. Thereafter, the analytics interactions in the series of analytics interactions that are jumped over become inactive. For instance, in FIG. 1E, the interaction in step 5 as described in Table 1 is jumped over. This results in an icon having a color representation (e.g., grey) that is different from the other active contexts (shown in black). The icon also has a different fill pattern (e.g., solid grey) from the current context that is filled with diagonal pattern. Similarly, in FIG. 1H, the jumped over analytics contexts corresponding to steps 8-12 in Table 1 are colored grey. The inactive contexts can be represented using any other visual forms to distinguish them from other types of analytics contexts.

Unlike breadcrumbs in web pages or other scenarios, the jumped-over analytics contexts here do not disappear from the representation. Rather, it shall be kept for user reference in order to help the user better understand previous analytics interactions, and learn what actions produced relevant analytics results. The user can revert and re-activate any subset of inactive analytics contexts on analytics canvas using the tool provided by the disclosed interactive system.

Representation of Analytics Contexts in Expandable Form

Figure 3A:
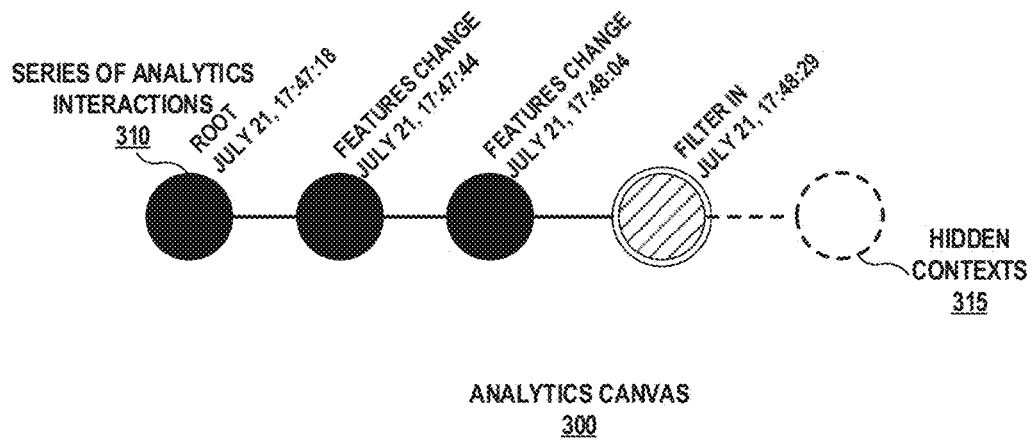
FIGS. 3A-3B are block diagrams of an example interactive system to present a series of analytics contexts with hidden contexts to a user in a linear form.
Figure 3B:
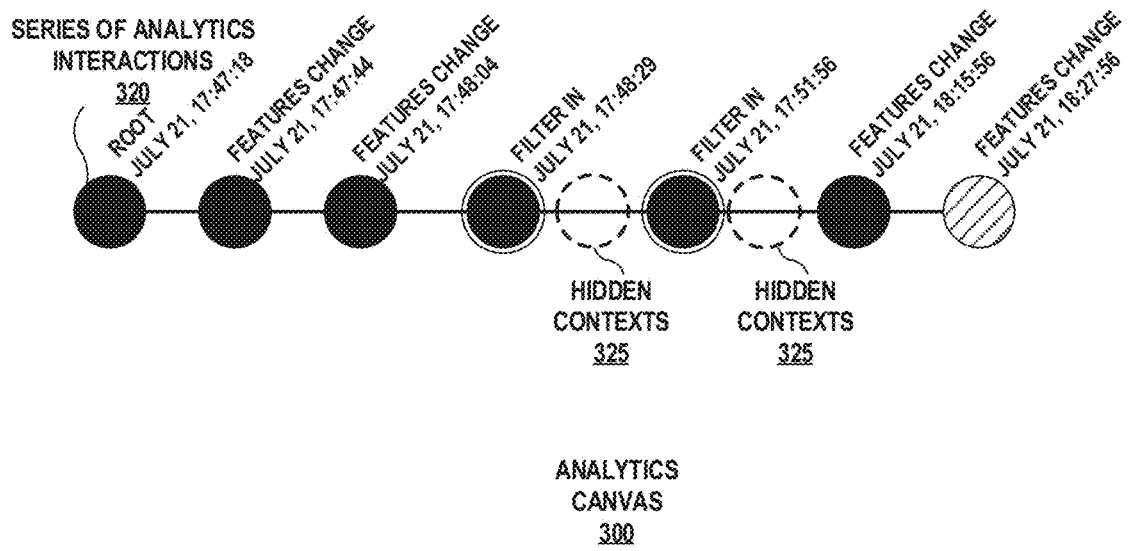

FIGS. 3A-3B are block diagrams of an example interactive system to present a series of analytics interactions with hidden contexts to a user in a linear form. FIGS. 3A-3B each includes an analytics canvas 300. Analytics canvas 300 is used to display to the user, via a graphical user interface, a tool for managing and navigating analytics contexts described in the previous section. In particular, analytics canvas 300 includes at least a series of analytics interactions.

In this example, a user can choose to see the superposition breadcrumbs in an expandable form. The expandable form hides historical actions that were jumped over and no longer active. However, the disclosed interactive system leaves some type of visual reminder to the user. For example, hidden contexts 315 in a series of analytics interactions 310 in FIG. 3A and hidden contexts 325 in a series of analytics interactions 320 in FIG. 3B are represented in dotted circles, indicating to the user that there exist at least one inactive context, and allowing the user to review the hidden contexts if the user chooses to do so. Although in this example, jumped over actions are reduced to a dotted line and/or a dotted circle, visual reminders of the existence of hidden inactive actions may vary and may be represented by different visual forms.

Once a new analytics interaction is applied after the jump-back user interaction, the dotted trail becomes just a visual superposition of a dotted circle on place between previous active analytics interaction and current analytics interaction as shown in FIG. 3B. In some implementations, the visual reminders are presented only in case there is at least one new action applied afterwards.

Figure 4A:
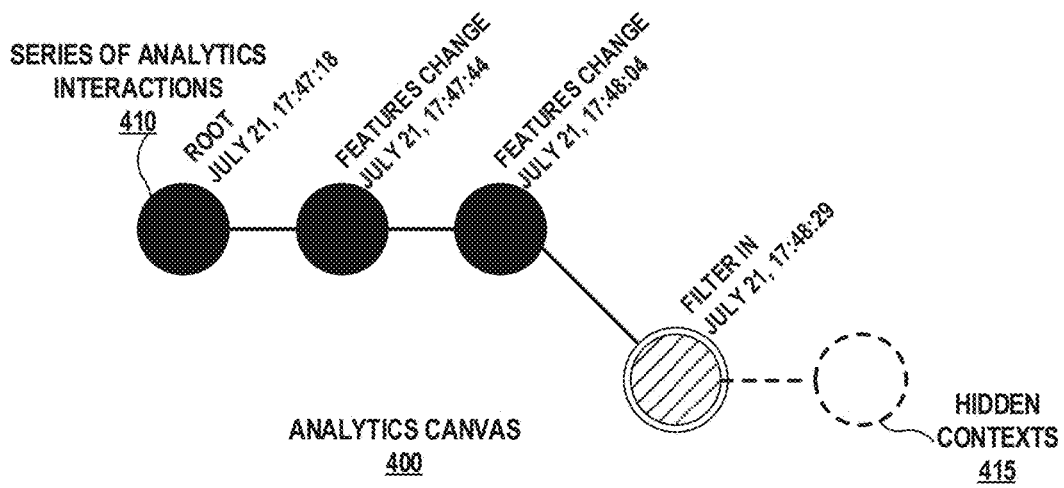
FIGS. 4A-4C are block diagrams of an example interactive system to present a series of analytics contexts with hidden contexts to a user in a leveled form.
Figure 4B:
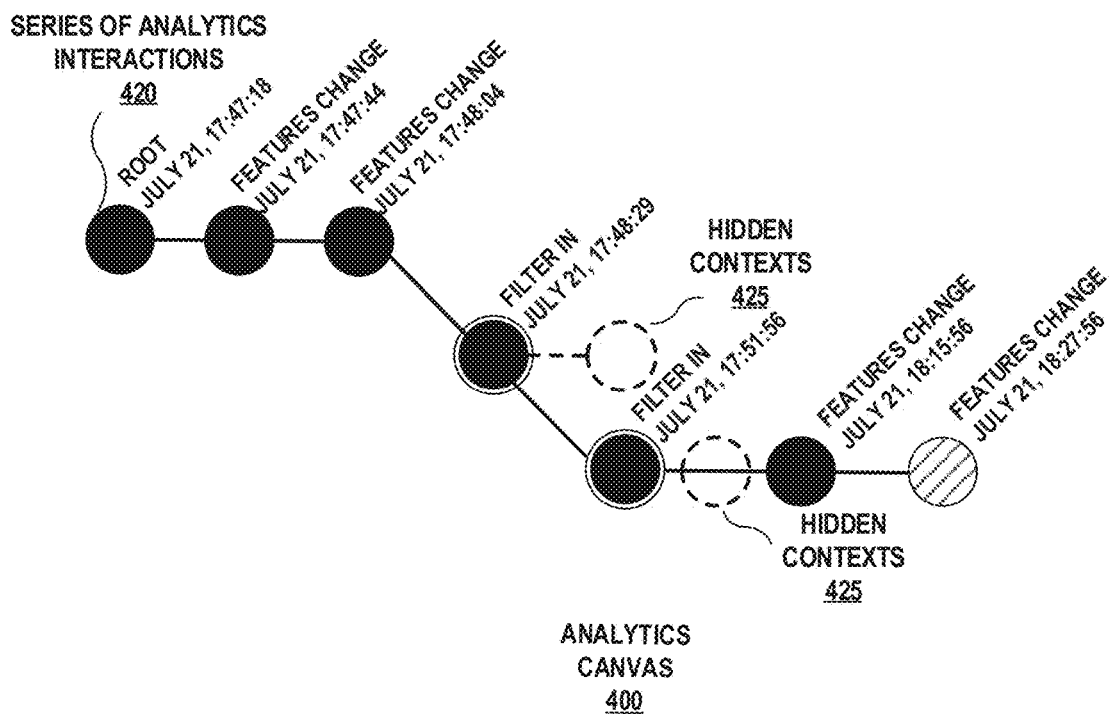
Figure 4C:
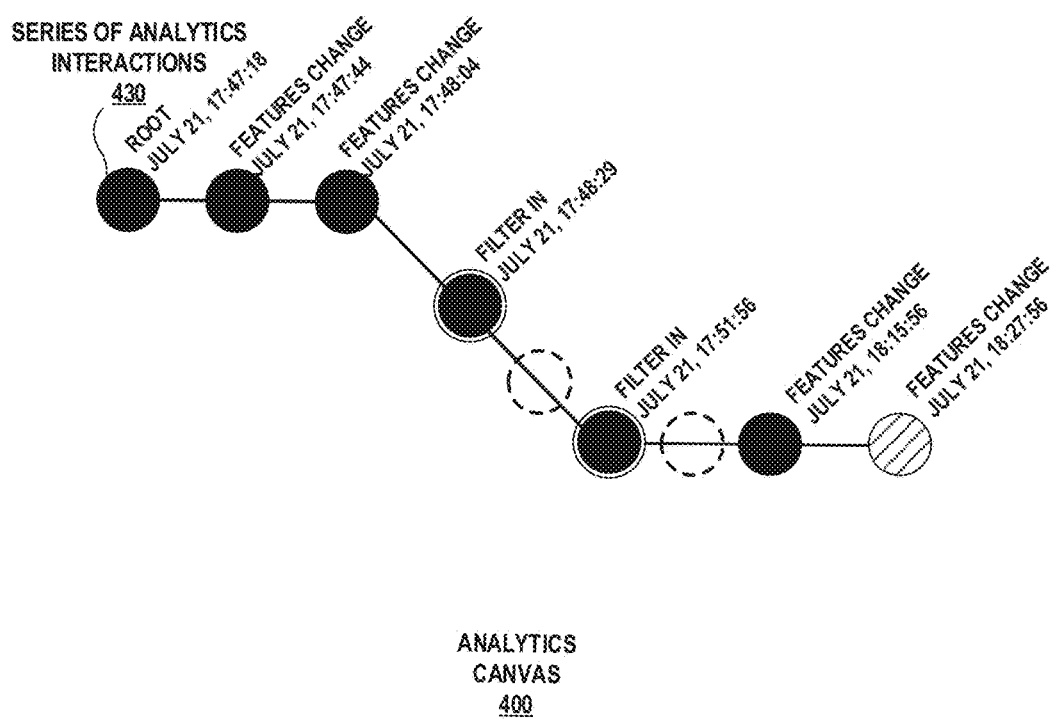

FIGS. 4A-4C are block diagrams of an example interactive system to present a series of analytics interactions with hidden contexts to a user in a leveled form. FIGS. 4A-4C each includes an analytics canvas 400. Analytics canvas 400 is used to display to the user, via a graphical user interface, a tool for managing and navigating analytics contexts described in the section above. In particular, analytics canvas 400 includes at least a series of analytics interactions, such as, a series of analytics interactions 410 and a series of analytics interactions 420. The series of analytics interactions 410 in FIG. 4A and the series of analytics interactions 420 in FIG. 4B also include a number of hidden contexts, such as hidden context 415 and hidden contexts 425. Here, depending on whether the hidden context includes any pre-defined type of analytics interactions, the visual reminder may be in the same level as the last active context prior to the hidden context, or in a new level below or above to the last active context. FIG. 4C presents another alternative series of analytics interactions 430 that includes the same hidden contexts as in FIG. 4B. However, all of the jumped over analytics interactions are reduced to dotted circles without a dotted line or trail.

Representation of Reference Contexts in Relation to Current Context

Analytics interactions that a user chooses to apply may not be commutative. As such, the order by which such analytics interactions are applied matters. This is because in the case of data analytics, same set of interactions applied in different order will often result in different results. In addition, some analytics compare the data in the current context to a reference context and provide differential analysis.

The disclosed interactive system is able to represent the reference context in relation to the current context. For illustration purposes only, assuming that, by default, the reference context is the last active context prior to the current context. FIGS. 5A-5I are block diagrams of an example interactive system to present a series of analytics interactions with a default reference context to a user. FIGS. 5A-5I each includes an analytics canvas 500. Analytics canvas 500 is used to display to the user, via a graphical user interface, a tool for managing and navigating analytics contexts described in the section above. In particular, analytics canvas 500 includes at least a series of analytics interactions.

Figure 5A:
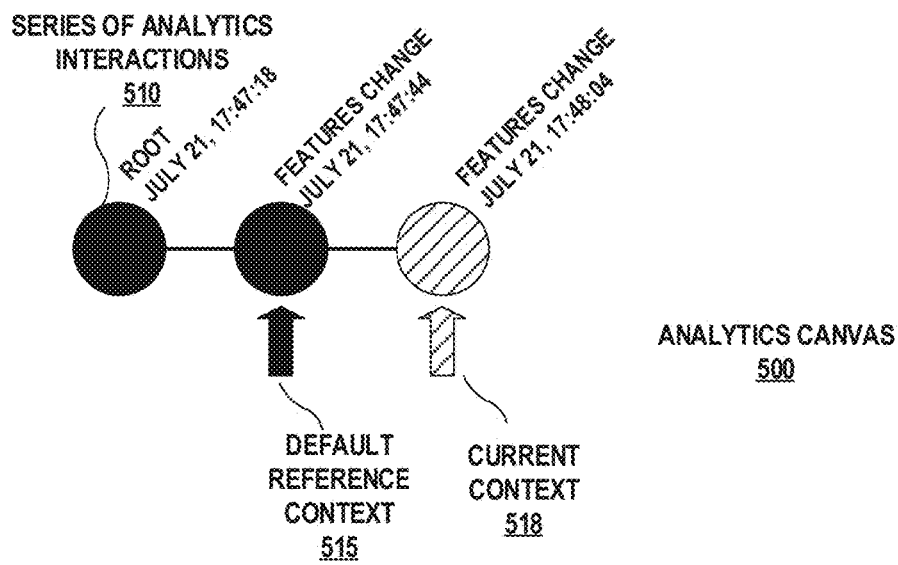

Referring now to FIG. 5A, this figure shows an example superposition breadcrumbs list including a default reference context after applying analytics interaction steps 1-3 illustrated in Table 1. Here, current context 518 in a series of analytics interactions 510 is marked with an arrow filled with a diagonal pattern. By contrast, default reference context 515 in a series of analytics interactions 510 is marked with an arrow colored in black, pointing to the second to last icon (which corresponds to the last active context) in a series of analytics interactions 510.

Figure 5B:
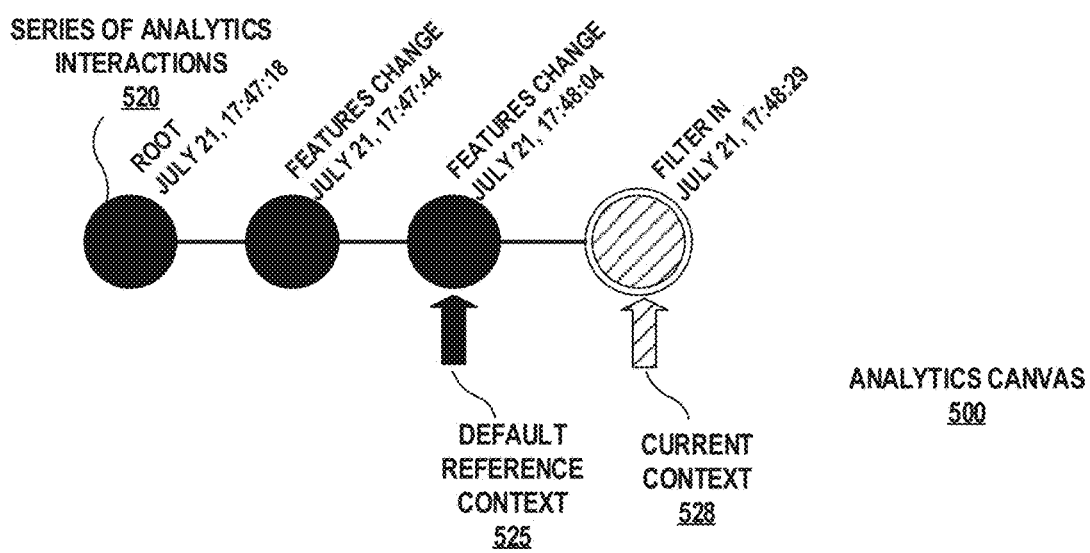
Figure 5C:
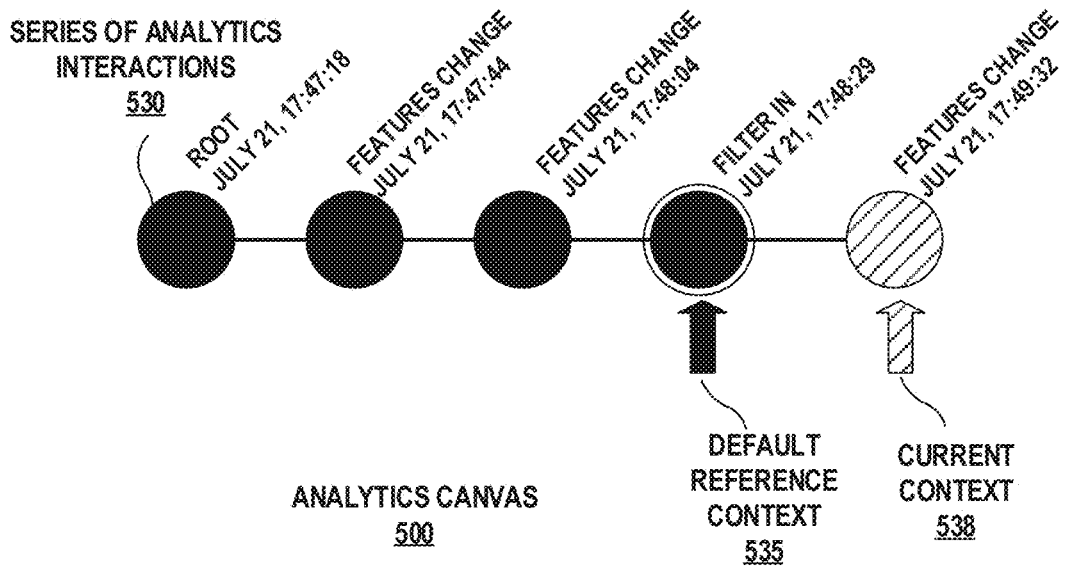

Similarly, FIG. 5B shows an example superposition breadcrumbs list including a default reference context after applying analytics interaction steps 1-4 illustrated in Table 1. In FIG. 5B, current context 528 in a series of analytics interactions 520 is marked with an arrow filled with a diagonal pattern, and default reference context 525 in a series of analytics interactions 520 is marked with an arrow colored in black, pointing to the second to last icon in a series of analytics interactions 520. Moreover, FIG. 5C shows an example superposition breadcrumbs list including a default reference context after applying analytics interaction steps 1-5 illustrated in Table 1. In FIG. 5C, current context 538 in a series of analytics interactions 530 is marked with an arrow filled with a diagonal pattern, and default reference context 535 in a series of analytics interactions 530 is marked with a black arrow pointing to the second to last icon in a series of analytics interactions 530.

Figure 5D:
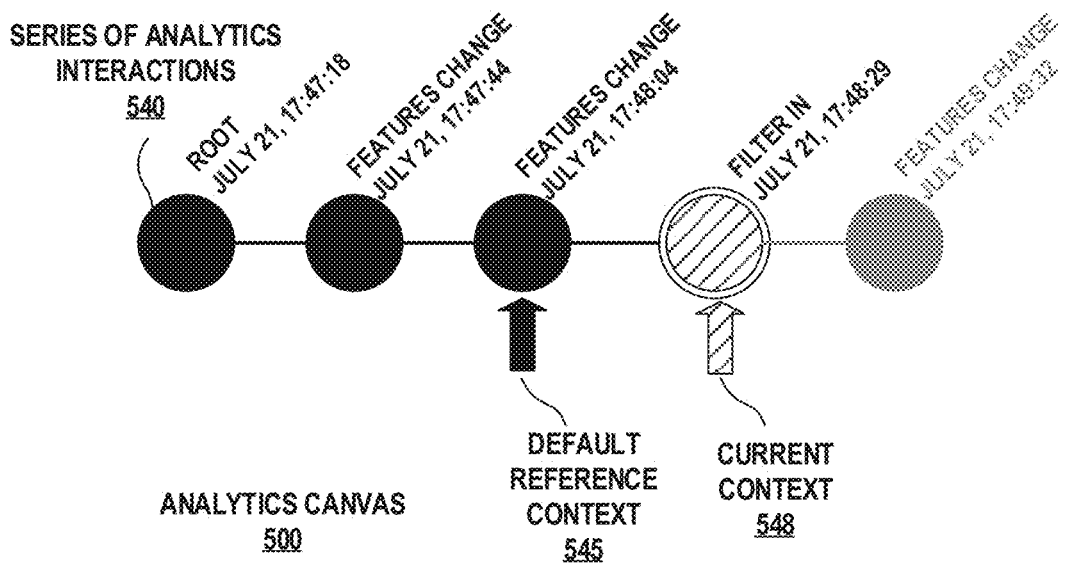

Referring now to FIG. 5D, this figure shows an example superposition breadcrumbs list including a default reference context after applying analytics interaction steps 1-6 illustrated in Table 1. Because the analytics interaction in step 6 jumps back to step 4, the analytics interaction of Filter In at July 21, 17:48:29 (e.g., the analytics interaction of step 4) becomes the current context. The Features Change in step 5 is skipped by the jump back interaction in step 6. Therefore, icon corresponding to Features Change at July 21, 17:49:32 in a series of analytics interactions 540 becomes inactive. As such, current context 548 in a series of analytics interactions 540 is marked with an arrow filled with a diagonal pattern, and default reference context 545 in a series of analytics interactions 540 is marked with a black arrow, pointing to the last active icon before the current context in a series of analytics interactions 540.

Figure 5E:
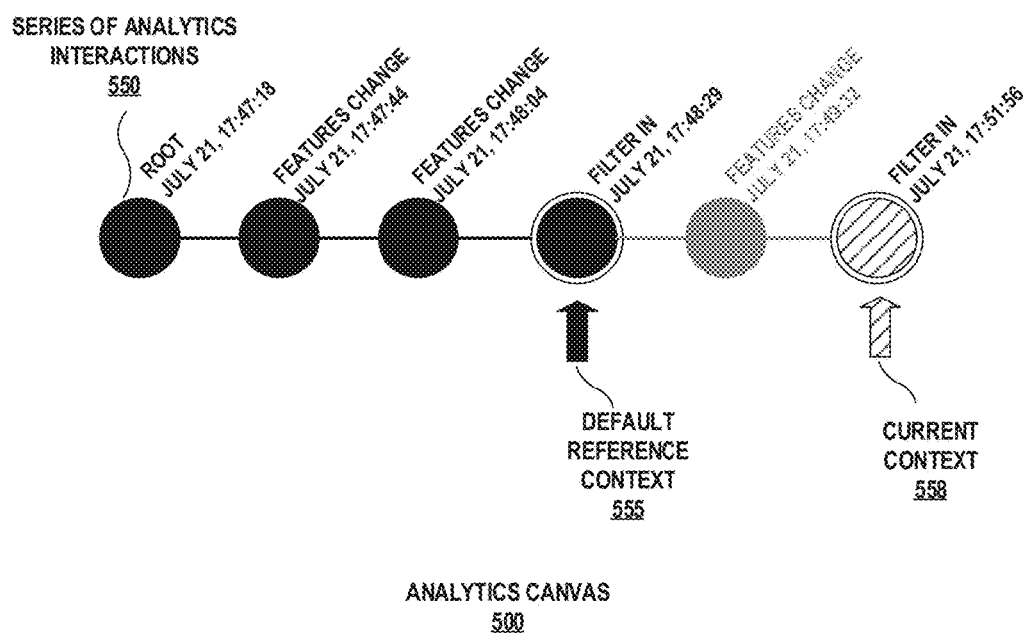

FIG. 5E shows an example superposition breadcrumbs list including a default reference context after applying analytics interaction steps 1-7 illustrated in Table 1. Here, a subsequent Filter In interaction at July 21, 17:51:56 is applied after an initial Filter In interaction in step 4. Therefore, current context 558 in a series of analytics interactions 550 is marked with an arrow filled with a diagonal pattern, and default reference context 555 in a series of analytics interactions 550 is marked with a black arrow. Note that the arrow corresponding to default context 555 points to the last active icon before the current context in a series of analytics interactions 550, rather than the immediate inactive icon prior to the current context. The last active context can be determined dynamically and automatically by the disclosed interactive system.

FIG. 5F shows an example superposition breadcrumbs list including a default reference context after applying analytics interaction steps 1-12 illustrated in Table 1. In a series of analytics interactions 560, except for the icon corresponding to step 5, other icons in the series of analytics interactions 560 correspond to either active or current contexts. Therefore, current context 568 in the series of analytics interactions 560 is marked with an arrow filled with a diagonal pattern, and default reference context 565 in the series of analytics interactions 560 is marked with a black arrow, pointing to the last active context immediately prior to current context 568.

FIG. 5G shows an example superposition breadcrumbs list including a default reference context after applying analytics interaction steps 1-13 illustrated in Table 1. Because step 13 in Table 1 includes analytics interaction of jumping back to step 7, current context 578 points to the interaction at step 7, which is represented by the icon corresponding to the analytics interaction of Filter In at July 21, 17:51:56. Also, because steps 8-12 are skipped, the icons in a series of analytics interactions 570 that correspond to those steps are colored in grey, indicating that they are inactive contexts. The icon corresponding to a previously jumped over context, e.g., Features Change July 21, 17:49:32, is also colored in grey. Therefore, default reference context 575 points to the last active context prior to the current context, which is Filter In interaction applied at July 21, 17:48:29.

FIG. 5H shows an example superposition breadcrumbs list including a default reference context after applying analytics interaction steps 1-14 illustrated in Table 1. Here, step 14 corresponds to an analytics interaction of Features Change at July 21, 18:15:56. Therefore, in a series of analytics interactions 580, the last current context (e.g., icon 578 in FIG. 5G) becomes an active context, and a new analytics context (as represented by icon 588) is created to represent the current analytics context in FIG. 5H. As such, current context 588 points to the newly created interaction context, whereas default reference context 585 points to the active context that was the last current context (e.g., icon 578 in FIG. 5G).

FIG. 5I shows an example superposition breadcrumbs list including a default reference context after applying analytics interaction steps 1-15 illustrated in Table 1. Here, step 15 corresponds to an analytics interaction of Features Change at July 21, 18:27:56. Therefore, in a series of analytics interactions 590, the last current context (e.g., icon 588 in FIG. 5H) becomes an active context, and a new analytics context (as represented by icon 598) is created to represent the current analytics context in FIG. 5I. As such, current context 598 points to the newly created interaction context, whereas default reference context 595 points to the active context that was the last current context (e.g., icon 588 in FIG. 5H).

The disclosed interactive system represents the reference context to a user so that the user could comprehend the presented results better. Although in FIGS. 5A-5I, the arrow filled with diagonal pattern represents the current context, whereas the black arrow represents the reference context, the form and the color of this superimposed information may be represented by different visual forms. The visualization is refreshed and updated automatically to represent the correct default reference context as each analytics interaction is applied.

Figure 6A:
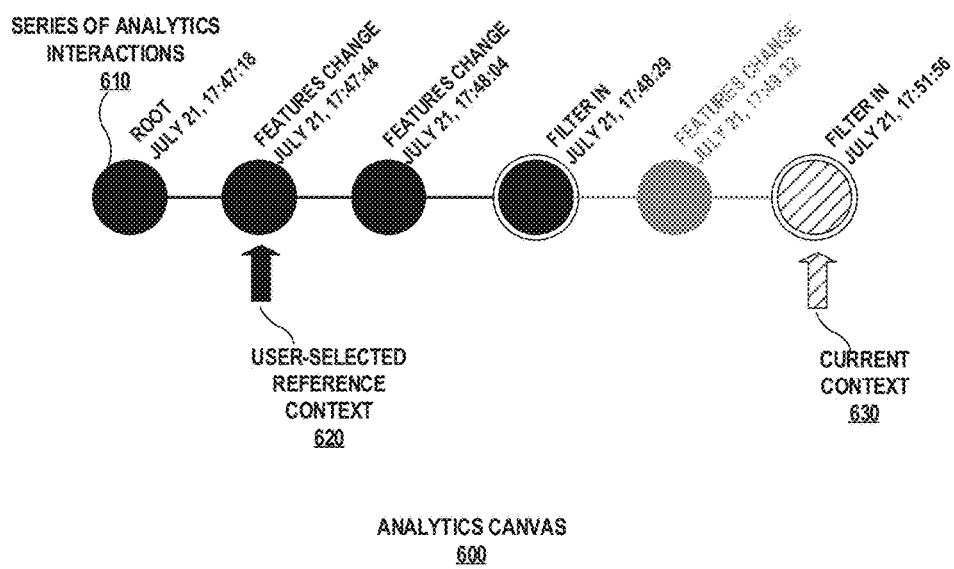
FIGS. 6A-6B are block diagrams of an example interactive system to present a series of analytics contexts with a user-selected reference context to a user.
Figure 6B:
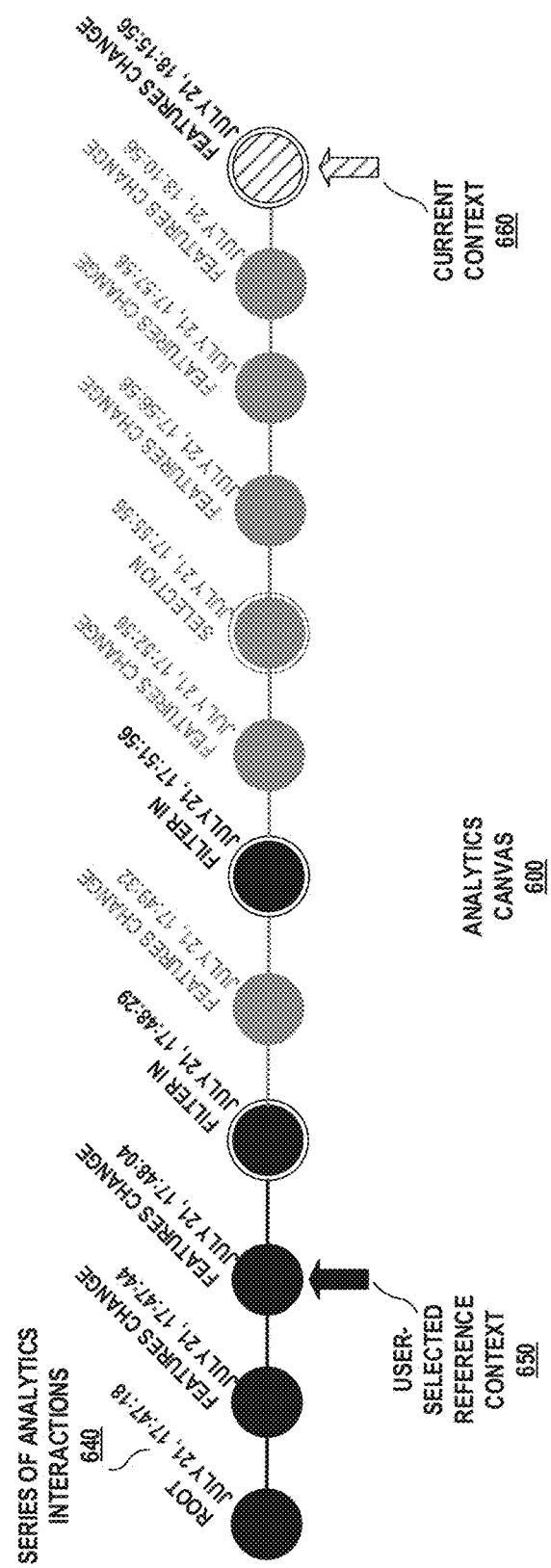

In some cases, the user may choose a different reference context and see how current analytic results change if the user chooses a different reference context from the list of previous active contexts. The disclosed interactive system allows the user to click on the black arrow corresponding to the default reference context and reposition it on a different active icon on the superposition breadcrumbs list. When a user-selected reference context is applied, all visible analytics results of the current context would be recomputed and refreshed to the user. FIGS. 6A-6B are block diagrams of an example interactive system to present a series of analytics contexts with a user-selected reference context to a user. For example, in FIG. 6A, a series of analytics interactions 610 includes current context 630 corresponding to a Filter In interaction applied at July 21, 17:51:56. However, instead of the default reference context (e.g., Filter In interaction applied at July 21, 17:48:29), the user can select Features Change interaction applied at July 21, 17:47:44 as user-selected reference context 620. As another example, in FIG. 6B, a series of analytics interactions 640 includes current context 660 corresponding to Features Change interaction applied at July 21, 18:15:56. However, instead of the default reference context (e.g., Filter In interaction applied at July 21, 17:51:56), the user can select Features Change interaction applied at July 21, 17:48:04 as user-selected reference context 650.

Process of Managing Analytics Contexts

Figure 7:
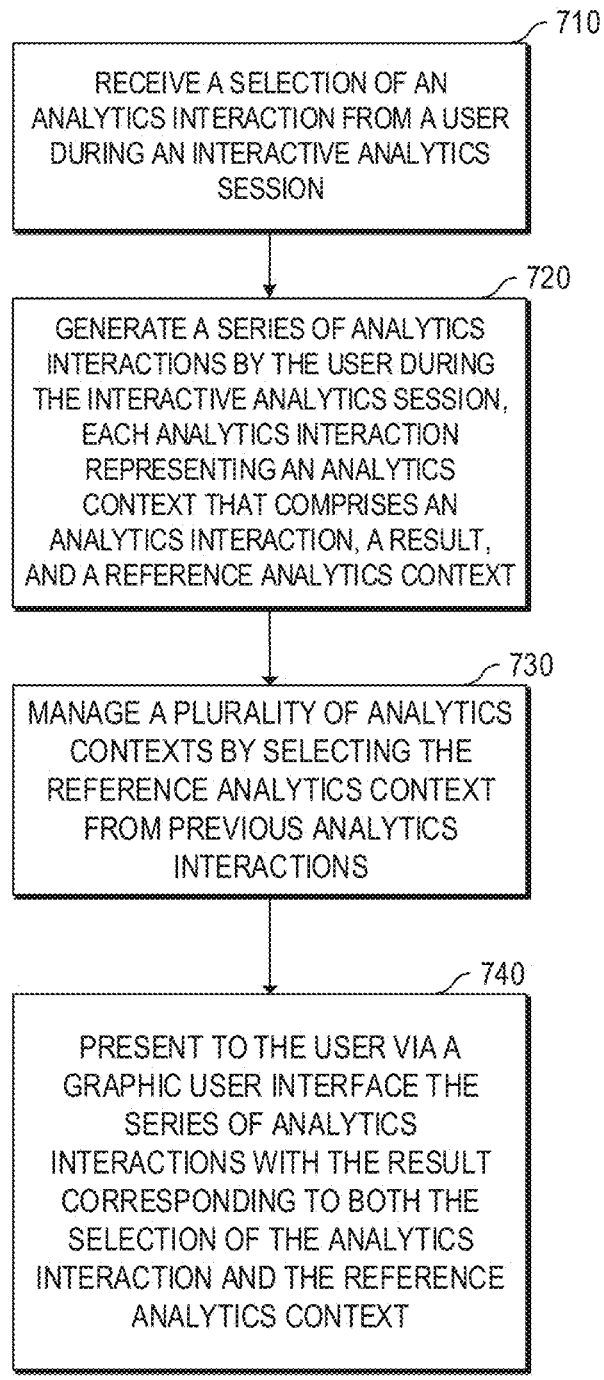
FIG. 7 is a flowchart of an example process of managing analytics contexts through a series of analytics interactions via a graphical user interface.

FIG. 7 is a flowchart of an example process of managing analytics contexts through a series of analytics interactions via a graphical user interface. Specifically, FIG. 7 begins when a disclosed interactive system receives a selection of an analytics interaction from a user during an interactive analytics session (operation 710).

An interactive analytics session generally refers to a time window during which a user performs a series of analytics interactions and is presented with resulting data accordingly after each analytics interaction is performed. The disclosed interactive system also incorporates a computational component that automatically stores the list of analytics interactions during an interactive analytics session, the order of analytics interactions, and the type of analytics interactions (e.g., feature selection, derived features, feature change, result feedback, filter-in, filter-out, selection, etc.) with relevant information for each analytics context, e.g., data source, active or inactive contexts, reference context, and data results. Also, the data results may be not stored but rather recomputed if needed. This option of storing the mentioned above information allows the user to split an otherwise long session of interactive analytics flow and data investigation into separate sessions. This is especially useful, for example, when the user wants to split a session into separate days or recover after a sudden web service shut down. The user may select a previous session from a drop-down menu and upload the selected session to resume the session. The session can be identified by a start time. Other features may be added to the session name as well. For example, the number of analytics interactions or names of the first and last analytics interaction may also be added to the session name. By default, whenever the system starts running, a new session begins. However, the user may choose to upload a different stored session. If a previous session is chosen as a starting point, the superposition breadcrumbs list would be populated and all relevant information (such as, active or inactive analytics context, type of analytics interaction, names of all analytics interactions, and reference context) would be visually represented. The type of view (e.g., linear form, leveled form, expandable form, etc.) can be chosen again by the user. New analytics interactions would be added to the uploaded list. Also, the disclosed interactive system can upload the stored list subsequently to resume the interactive analytics session.

Next, the disclosed interactive analytics system generates a series of analytics interactions by the user during the interactive analytics session (operation 720). Each analytics interaction represents an analytics context that includes an analytics interaction, a result, and a reference analytics context. Here, the analytics context may include, but is not limited to, a current context, a previous context, an active context, an inactive context, a pre-defined type of analytics interactions, a user-selected reference context, a default reference context, or any combination thereof. Then, the disclosed interactive system manages a plurality of analytics contexts by selecting the reference analytics context from previous analytics interactions (operation 730). Thereafter, the disclosed interactive system presents to the user via a graphic user interaction the series of analytics interactions corresponding to both the selection of the analytics interaction and the reference analytics context (operation 740).

In some implementations, each analytics interaction in the series of analytics interaction is represented by a combination of a particular icon and a representative text corresponding to the each analytics interaction. The representative text may include a text identifying an analytics interaction, a timestamp corresponding to when the analytics interaction occurs, and information about the result.

The graphical user interface uses a plurality of visualization styles corresponding to different types of analytics contexts and analytics interactions. For example, the plurality of visualization styles may include a combination of: icons having different colors; icons having different fill patterns; icons having different shapes; icons having different shade effects; icons having different outline effects; and icons having different highlights. In addition, the visualization style comprises one of a linear form, a tree form, an expandable form, and a hidden form.

The different types of analytics contexts may include a current context, a previous context, an active context, an inactive context, a predefined type of analytics interactions, and a user-selected reference context. For example, when a user selects a previous analytics interaction in the series of analytics interactions, the analytics context corresponding to the previous analytics interaction becomes the active context, and any skipped analytics contexts between the selected previous analytics context and the current context become inactive contexts.

The series of analytics interactions includes at least one of a root, a feature selection, a derived feature, a feature change by changing a weight of a feature from the result, a filter in by including a part of the result, a filter out by excluding the part of the result, and a reference analytics context change. Here, the part can be a cluster of data presented as a group, a table, or any other presentations to the user. In some implementations, the user can filter in or filter out based on the groups predefined or suggested automatically by the disclosed interactive system. In some implementations, the user can customize the selection of the part to be filtered in or out. Furthermore, data in the analytics context is compared to data in a corresponding reference analytics context to provide differential analysis.

The reference analytics context includes one of a default reference analytics context and a user-selected reference analytics context, wherein the reference analytics context is presented to the user using a unique visualization style through which is configurable by the user to change the reference analytics context.

In some implementations, the disclosed interactive system further stores the series of analytics interactions and corresponding analytics contexts, and uploads the stored series of analytics interactions subsequently to resume the interactive analytics session.

Figure 8:
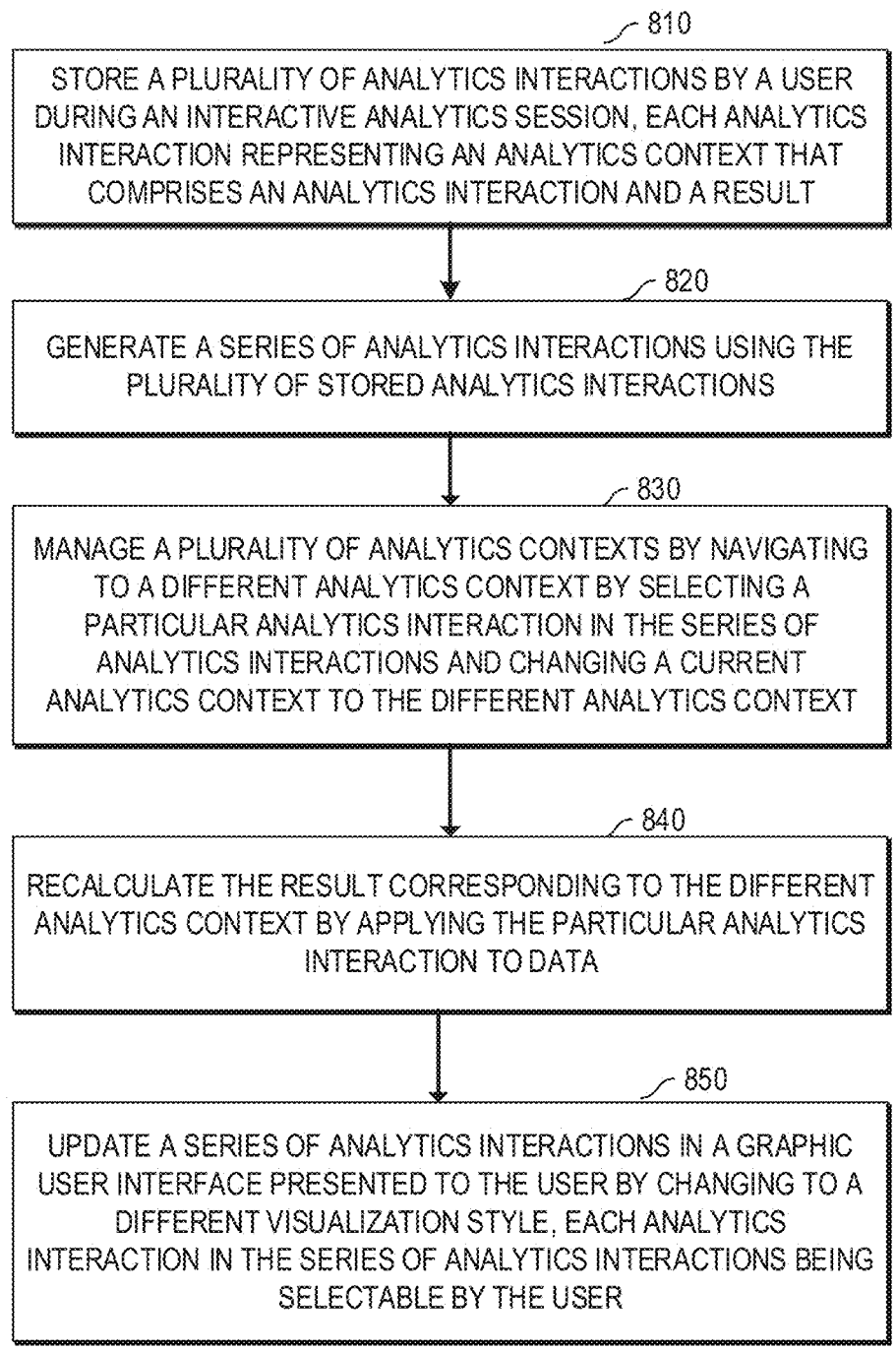
FIG. 8 is a flowchart of an example process of managing analytics contexts through a series of analytics interactions via a graphical user interface.

FIG. 8 is a flowchart of another example process of managing analytics contexts through a series of analytics interactions via a graphical user interface. During operations, a disclosed interactive system stores a plurality of analytics interactions by a user during an interactive analytics session (operation 810). Each analytics interaction represents an analytics context that comprises an analytics interaction and a result. Then, the disclosed interactive system generates a series of analytics interactions using the plurality of stored analytics interactions (operation 820). Furthermore, the disclosed interactive system manages a plurality of analytics contexts by navigating to a different analytics context by selecting a particular analytics interaction in the series of analytics interactions and changing a current analytics context to the different analytics context (operation 830). Next, the disclosed interactive system recalculates the result corresponding to the different analytics context by applying the particular analytics interaction to data (operation 840). Subsequently, the disclosed interactive system updates a series of analytics interactions in a graphical user interface presented to the user by changing to a different visualization style, each analytics interaction in the series of analytics interactions being selectable by the user (operation 850).

Figure 9:
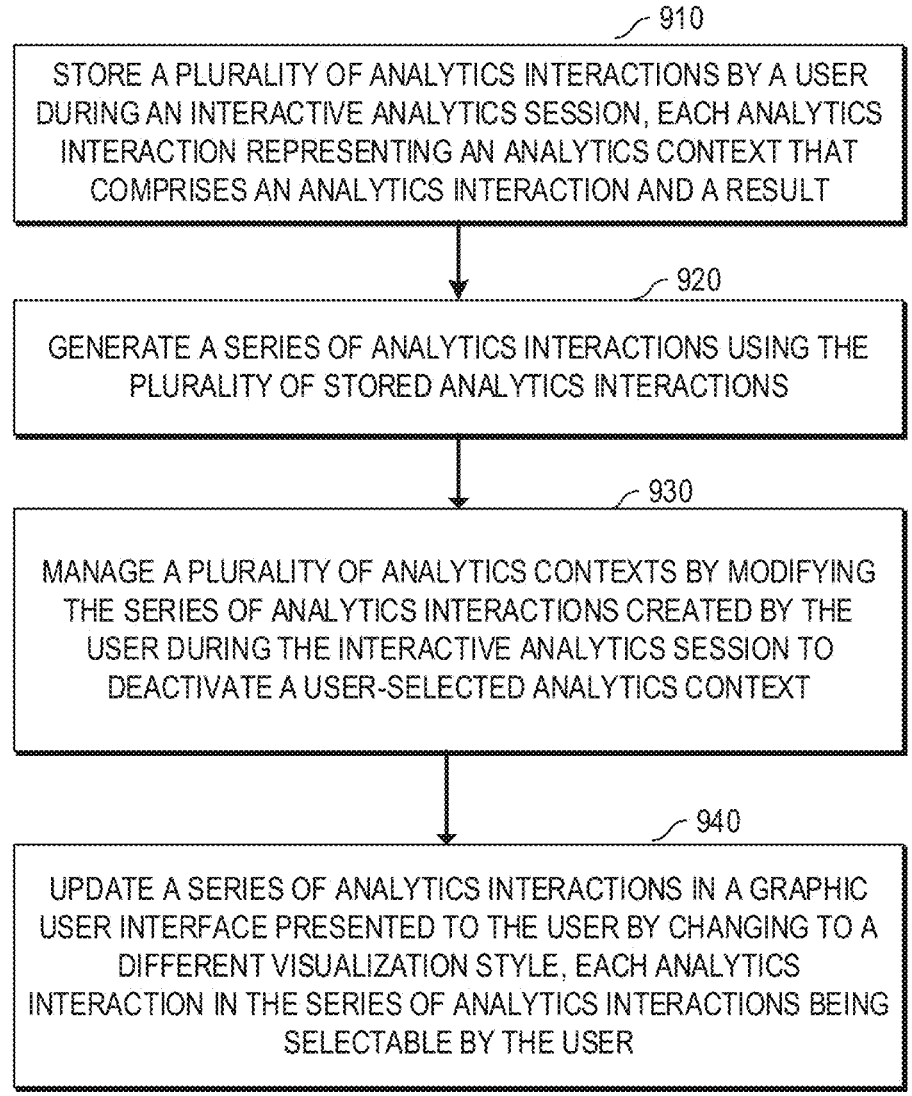
FIG. 9 is a flowchart of an example process of managing analytics contexts through a series of analytics interactions via a graphical user interface.

FIG. 9 is a flowchart of another example process of managing analytics contexts through a series of analytics interactions via a graphical user interface. During the operations, a disclosed interactive system stores a plurality of analytics interactions by a user during an interactive analytics session, whereas each analytics interaction represents an analytics context that includes an analytics interaction and a result (operation 910). The disclosed interactive system then generates a series of analytics interactions using the plurality of stored analytics interactions (operation 920). Next, the disclosed interactive system manages a plurality of analytics contexts by modifying the series of analytics interactions created by the user during the interactive analytics session to deactivate a user-selected analytics context (operation 930). Moreover, the disclosed interactive system updates the series of analytics interactions in a graphical user interface presented to the user by changing to a different visualization style (operation 940). Here, each analytics interaction in the series of analytics interactions is selectable by the user.

A special purpose computer is used to perform these operations that solve the issues with managing analytics contexts rooted in computer technology given the ease with which data is stored, analyzed, and presented. The present disclosure makes improvements to the working of the computer itself by implementing these operations. Thus, the disclosed features are advances in the field of data analytics presentation.

Machine Readable Storage Medium to Manage Analytics Contexts

The present disclosure also may be embedded in a non-transitory computer-readable storage medium (e.g., a programmable circuit; a semiconductor memory such as a volatile memory such as random access memory "RAM," or non-volatile memory, such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Figure 10:
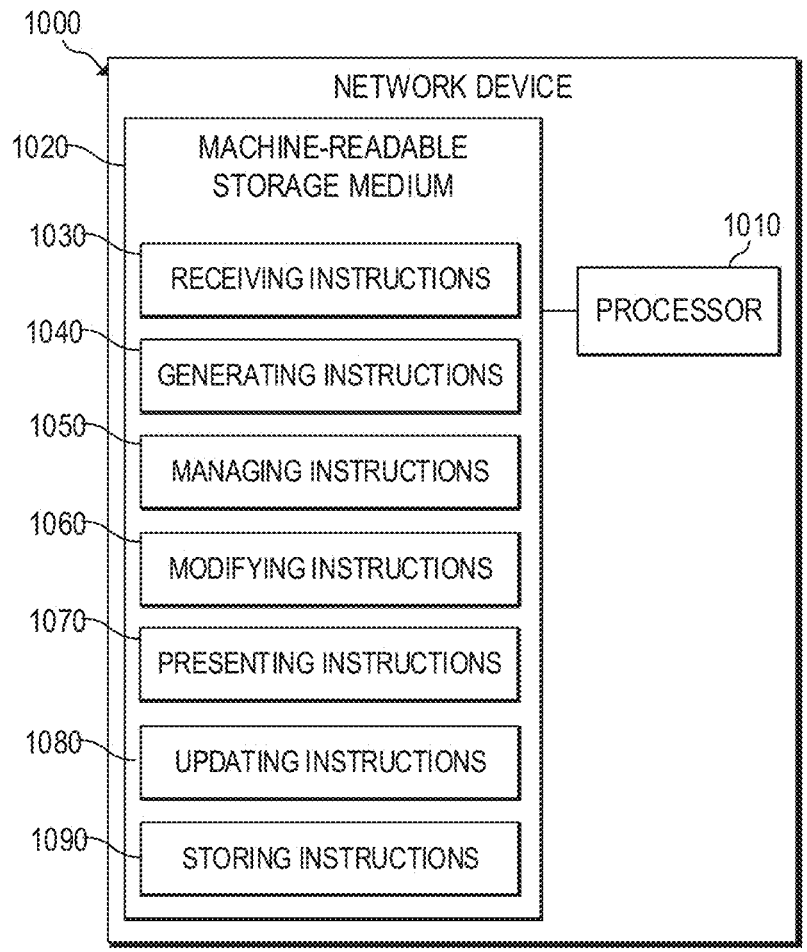
FIG. 10 is a block diagram of an example network device to manage analytics contexts through a series of analytics interactions via a graphical user interface.

FIG. 10 is a block diagram of an example network device to manage analytics contexts through a series of analytics interactions via a graphical user interface. Specifically, network device 1000 generally includes a device suitable for presenting a series of analytics contexts to a user. As illustrated in FIG. 10, network device 1000 includes at least one hardware processor 1010 and a machine-readable storage medium 1020.

Processor 1010 may be central processing units (CPUs), CPU cores, semiconductor-based microprocessors, and/or other hardware devices suitable for retrieval and execution of instructions stored in machine-readable storage medium 1020. Processor 1010 may fetch, decode, and execute one or more of instructions 1030-1090 to manage and navigate the series of analytics contexts to the user. As an alternative or in addition to retrieving and executing instructions, processor 1010 may include one or more electronic circuits that include electronic components for performing the functionality of one or more of instructions 1030-1090.

Specifically, the at least one processor 1010 executes instructions 1030-1090 to: receive a selection of an analytics interaction from a user during an interactive analytics session; generate a series of analytics interactions by the user during the interactive analytics session; manage a plurality of analytics contexts by selecting the reference analytics context from previous analytics interactions; present to the user via a graphical user interface the series of analytics interactions with the result corresponding to both the selection of the analytics interaction and the reference analytics context; store the series of analytics interactions and corresponding analytics contexts; upload the stored series of analytics interactions subsequently to resume the interactive analytics session; store a plurality of analytics interactions by a user during an interactive analytics session; generate a series of analytics interactions using the plurality of stored analytics interactions; manage a plurality of analytics contexts by navigating to a different analytics context by selecting a particular analytics interaction in the series of analytics interactions and changing a current analytics context to the different analytics context; recalculate the result corresponding to the different analytics context by applying the particular analytics interaction to data; manage a plurality of analytics contexts by modifying the series of analytics interactions created by the user during the interactive analytics session to de-activate a user-selected analytics context; update a series of analytics interactions in a graphical user interface presented to the user by changing to a different visualization style; etc.

Machine-readable storage medium 1020 may be any electronic, magnetic, optical, or other physical storage device that contains or stores executable instructions. Thus, machine-readable storage medium 1020 may be, for example, Random Access Memory (RAM), an Electrically Erasable Programmable Read-Only Memory (EEPROM), a storage device, an optical disc, and the like. In some implementations, machine-readable storage medium 1020 may be a non-transitory storage medium, where the term "non-transitory" does not encompass transitory propagating signals.

We claim:

1. A system comprising:
  a memory;
  a hardware processor executing instructions from the memory to:
    receive a selection of a current analytics interaction from a user during an interactive analytics session;
    generate a series of connected icons representing a series of analytics interactions in the interactive analytics session, wherein the series of connected icons includes a current context icon representing the current analytics interaction selected by the user during the interactive analytics session and a plurality of previous context icons representing previous analytics interactions in the interactive analytics session prior to the current analytics interaction, wherein the current context icon includes an analytics context comprising a timestamp of when the current analytics interaction occurs and a result of the current analytics interaction;
    select one of the previous context icons to be a reference context icon, the reference-context icon including a reference analytics context;
    display on a graphical user interface the series of connected icons representing the series of analytics interactions with the result of the current analytics interaction and the reference analytics context.

2. The system of claim 1, wherein the graphical user interface uses a plurality of visualization styles corresponding to different types of analytics interactions, the plurality of visualization styles comprising a combination of:
  icons having different colors;
  icons having different fill patterns;
  icons having different geometrical figures;
  icons having different shade effects;
  icons having different outline effects; and
  icons having different highlights.

3. The system of claim 2, wherein the visualization styles comprise one of a linear form, a tree form, an expandable form, and a hidden form.

4. The system of claim 1, wherein the connected icons comprise different types of analytics contexts including a current context, a previous context, an active context, an inactive context, a default reference context, and a user-selected reference context.

5. The system of claim 1, wherein the previous context icons include a root icon representing an analytics interaction that started the interactive analytics session.

6. The system of claim 1, wherein the current context icon comprises a name identifying the current analytics interaction.

7. The system of claim 1, wherein the series of analytics interactions comprises at least one of a root, a feature selection, a derived feature, a feature change by changing a weight of a feature from the result, a filter in by including a part of the result, a filter out by excluding the part of the result, and a reference analytics context change.

8. The system of claim 1, wherein data in the analytics context of the current context icon is compared to data in a corresponding reference analytics context of the reference context icon to provide differential analysis.

9. The system of claim 8, wherein the reference analytics context of the reference context icon comprises one of a default reference analytics context and a user-selected reference analytics context, wherein the reference analytics context is displayed using a visualization style different from visualization styles of other icons to mark the reference context icon.

10. The system of claim 1, wherein the hardware processor further executes instructions from the memory to:
  store the series of analytics interactions and corresponding analytics contexts; and
  upload the stored series of analytics interactions subsequently to resume the interactive analytics session.

11. A method comprising:
- storing, by a network device, a plurality of analytics interactions by a user during an interactive analytics session, each of the analytics interactions representing an analytics context of the analytics interaction and a result of the analytics interaction;
- in response to a selection of a current analytics interaction during the interactive analytics session, generating, by the network device, a series of connected icons representing a series of analytics interactions using the plurality of stored analytics interactions, wherein the series of connected icons includes a current context icon representing the current analytics interaction and previous context icons representing previous analytics interactions of the interactive analytics session prior to the current analytics interaction, wherein the current context icon includes a current analytics context of the current analytics interaction;
- displaying, on a graphical user interface, the series of connected icons representing the series of analytics interactions;
- managing, by the network device, analytics contexts of the series of analytics interactions by navigating the current analytics context to a different analytics context by selecting a particular analytics interaction in the series of analytics interactions that contains the different analytics context and changing the current analytics context to the different analytics context of the particular analytics interaction;
- recalculating, by the network device, the result corresponding to the different analytics context by applying the particular analytics interaction to data; and
- updating, by the network device, the series of analytics interactions on the graphical user interface by changing a visualization style of an icon corresponding to the particular analytics interaction to a different visualization style.

12. The method of claim 11, wherein the graphical user interface uses a plurality of visualization styles corresponding to different types of analytics contexts, the plurality of visualization styles comprising a combination of:
- icons having different colors;
- icons having different fill patterns;
- icons having different geometrical figures;
- icons having different shade effects;
- icons having different outline effects; and
- icons having different highlights.

13. The method of claim 11, wherein the series of connected icons comprises one of a linear form, a tree form, an expandable form, and a hidden form.

14. The method of claim 12, wherein the different types of analytics contexts comprise a current context, a previous context, an active context, an inactive context, a default reference context, and a user-selected reference context.

15. The method of claim 11, wherein the analytics context of each analytics interaction is represented by a combination of a particular icon and a representative text corresponding to the analytics context.

16. The method of claim 15, wherein the analytics context of each analytics interaction comprises a name identifying the analytics interaction and a timestamp corresponding to when the analytics interaction occurs, and information about the result of the analytics interaction.

17. The method of claim 16, wherein the series of analytics interactions comprises at least one of a root, a feature selection, a derived feature, a feature change by changing a weight of a feature from the result, a filter in by including a part of the result, a filter out by excluding the part of the result, and a reference analytics context change.

18. The method of claim 11, further comprising:
- storing, by the network device, the series of analytics interactions and corresponding analytics contexts; and
- uploading, by the network device, the stored series of analytics interactions subsequently to resume the interactive analytics session.

19. A non-transitory machine-readable storage medium encoded with instructions executable by at least one processor of a network device to cause the at least one processor to:
- store a plurality of analytics interactions by a user during an interactive analytics session, each analytics interaction including an analytics context of the analytics interaction and a result of the analytics interaction;
- in response to a selection of a current analytics interaction during the interactive analytics session, generate a series of connected icons representing a series of analytics interactions using the plurality of stored analytics interactions, wherein the series of connected icons includes a current context icon representing the current analytics interaction and previous context icons representing previous analytics interactions of the interactive analytics session prior to the current analytics interaction, wherein the current context icon includes a current analytics context of the current analytics interaction;
- display, on a graphical user interface, the series of connected icons representing the series of analytics interactions;
- manage the analytics contexts of the series of analytics interactions by modifying the series of analytics interactions created by the user during the interactive analytics session to deactivate a user-selected analytics context; and
- update the series of analytics interactions on the graphical user interface by changing a visualization style of one of the connected icons that includes the user-selected analytics context to a different visualization style.

20. The non-transitory machine-readable storage medium of claim 19, wherein the series of analytics interactions comprises at least one of a root, a feature selection, a derived feature, a feature change by changing a weight of a feature from the result, a filter in by including a part of the result, a filter out by excluding the part of the result, and a reference analytics context change.

* * * * *